(12) United States Patent
Ahmed et al.

(10) Patent No.: US 12,436,314 B2
(45) Date of Patent: Oct. 7, 2025

(54) TECHNOLOGIES FOR CHIP-TO-CHIP OPTICAL DATA TRANSFER BACKGROUND

(71) Applicant: Intel Corporation, Santa Clara, CA (US)

(72) Inventors: Khaled Ahmed, San Jose, CA (US); Pooya Tadayon, Portland, OR (US); Joshua B. Fryman, Corvallis, OR (US); Sergey Yuryevich Shumarayev, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 17/561,366

(22) Filed: Dec. 23, 2021

(65) Prior Publication Data

US 2023/0204819 A1    Jun. 29, 2023

(51) Int. Cl.
| | | |
|---|---|---|
| *H04B 10/00* | (2013.01) |
| *G02B 1/00* | (2006.01) |
| *H01L 25/16* | (2023.01) |
| *H04B 10/50* | (2013.01) |
| *G02B 5/04* | (2006.01) |
| *G02B 5/08* | (2006.01) |

(52) U.S. Cl.
CPC ............ *G02B 1/002* (2013.01); *H01L 25/167* (2013.01); *H04B 10/502* (2013.01); *G02B 5/04* (2013.01); *G02B 5/08* (2013.01)

(58) Field of Classification Search
CPC .. H04B 10/40; H04B 10/502; H04B 10/2507; H04B 10/801; G02B 6/4246; G02B 6/4214; G02B 6/43; G02B 6/12004; G02B 6/4257; G02B 6/4295; G02B 6/4245; H01L 25/167

USPC ....... 398/135, 136, 137, 138, 139, 158, 159, 398/164, 201, 182, 183, 188, 202, 208, 398/209; 385/89, 90, 92, 93, 14

See application file for complete search history.

(56) References Cited

U.S. PATENT DOCUMENTS

| | | | | |
|---|---|---|---|---|
| 11,822,138 B2* | 11/2023 | Kalman | ................... | G02B 6/43 |
| 12,181,660 B2* | 12/2024 | Di Marzio | ............... | G02B 5/09 |
| 2004/0159777 A1 | 8/2004 | Stone | | |
| 2016/0172020 A1 | 6/2016 | Baker et al. | | |

(Continued)

OTHER PUBLICATIONS

EPO European Extended Search Report in EP Application Serial No. 22201853.3 mailed on May 2, 2023, 10 pages.

(Continued)

*Primary Examiner* — Hanh Phan
(74) *Attorney, Agent, or Firm* — Alliance IP, LLC

(57) ABSTRACT

Technologies for chip-to-chip optical data transfer are disclosed. In the illustrative embodiment, microLEDs on a first chip are used to send data to microphotodiodes on a second chip. The beams from the microLEDs may be sent to the microphotodiodes using an optical bridge, microprisms, a channel through a substrate, a channel defined in a substrate, etc. The microLEDs may be used for high-speed data transfer with low power usage. A chip may include a relatively large number of microLEDs and/or microphotodiodes, allowing for a large bandwidth connection. MicroLEDs and microphotodiodes may be used to connect different parts of the same chip, different chips on the same package, different packages on the same device, or different chips on different devices.

25 Claims, 13 Drawing Sheets

(56) References Cited

U.S. PATENT DOCUMENTS

| | | |
|---|---|---|
| 2018/0092173 A1 | 3/2018 | Wu et al. |
| 2018/0190614 A1 | 7/2018 | Kumar et al. |
| 2021/0080664 A1* | 3/2021 | Pezeshki ............ G02B 6/12004 |
| 2021/0320718 A1* | 10/2021 | Kalman ................ H04B 10/40 |

OTHER PUBLICATIONS

Wang, Bing, et al., "On-chip Optical Interconnects using InGaN Light-Emitting Diodes Integrated with Si-CMOS," Asia Communications and Photonics Conference 2014, Jan. 1, 2014 (Jan. 1, 2014), Washington, D.C. DOI: 10.1364/ACPC.2014.AW4A.2; ISBN: 978-1-55752-852-0; 3 pages.

* cited by examiner

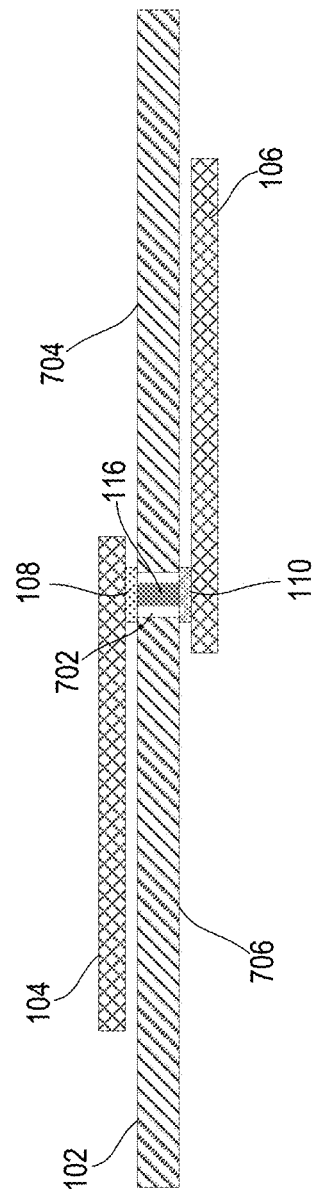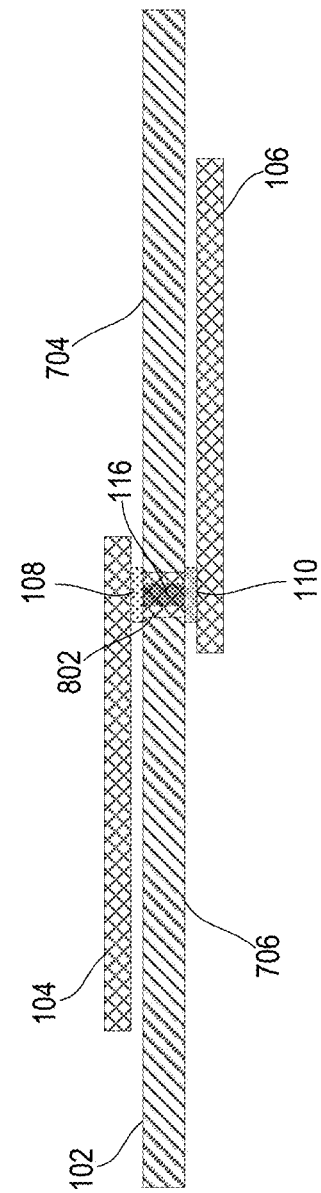

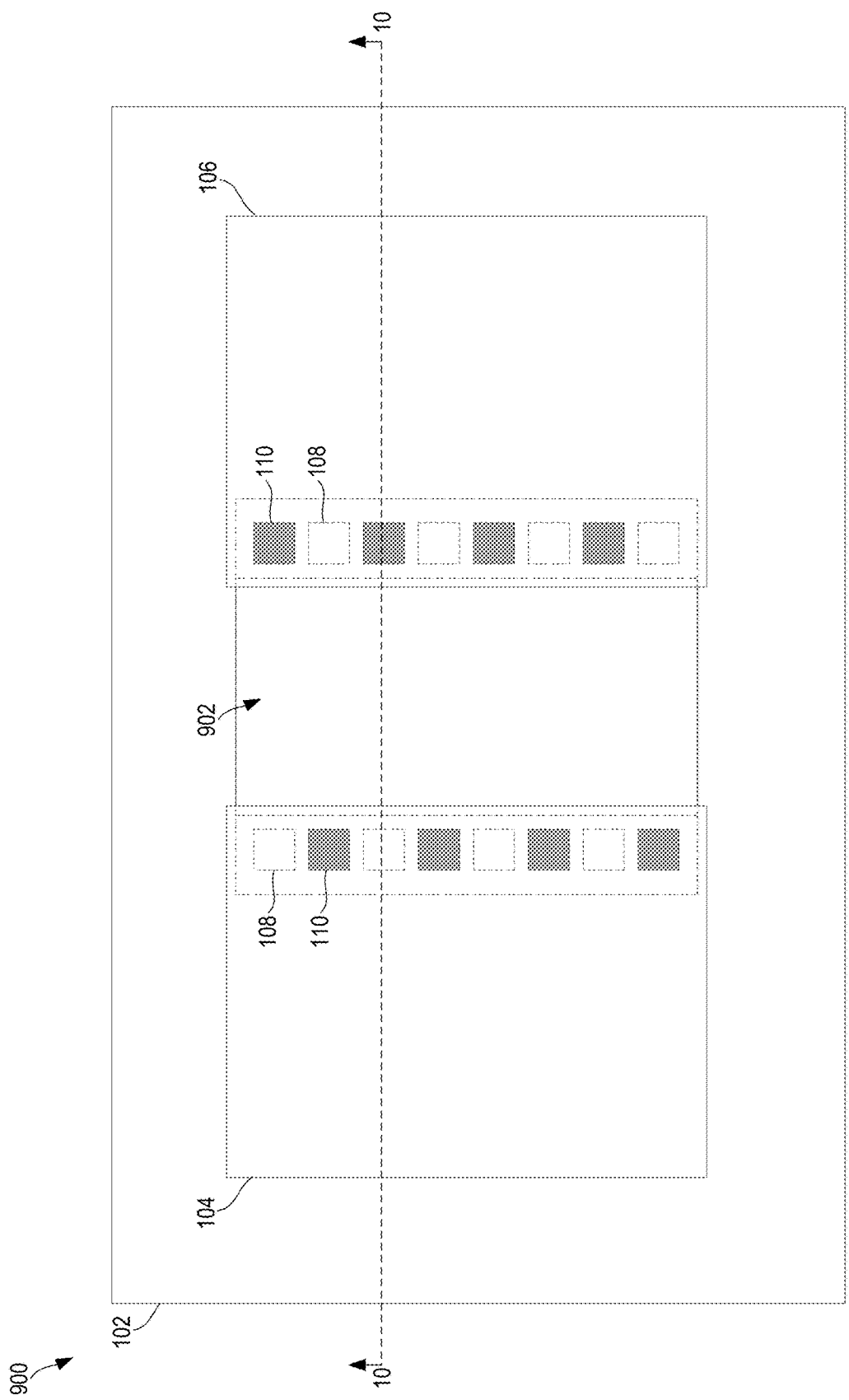

TECHNOLOGIES FOR CHIP-TO-CHIP OPTICAL DATA TRANSFER BACKGROUND

BACKGROUND

High-speed data transfer between chips (such as chips in the same package) is an important part of high-performance processors and other components. High-speed electrical data transferred over short to moderate distances can require a relatively large amount of power. Laser communication can provide high-speed data transfer with potentially less power, but laser communication can increase complexity and cost.

BRIEF DESCRIPTION OF THE DRAWINGS

FIG. 7 is a cross-sectional view of a system for chip-to-chip communication with microLEDs and microphotodiodes.

FIG. 8 is a cross-sectional view of a system for chip-to-chip communication with microLEDs and microphotodiodes.

FIG. 9 is a top-down view of a system for chip-to-chip communication with microLEDs and microphotodiodes.

DETAILED DESCRIPTION

Figure 1:
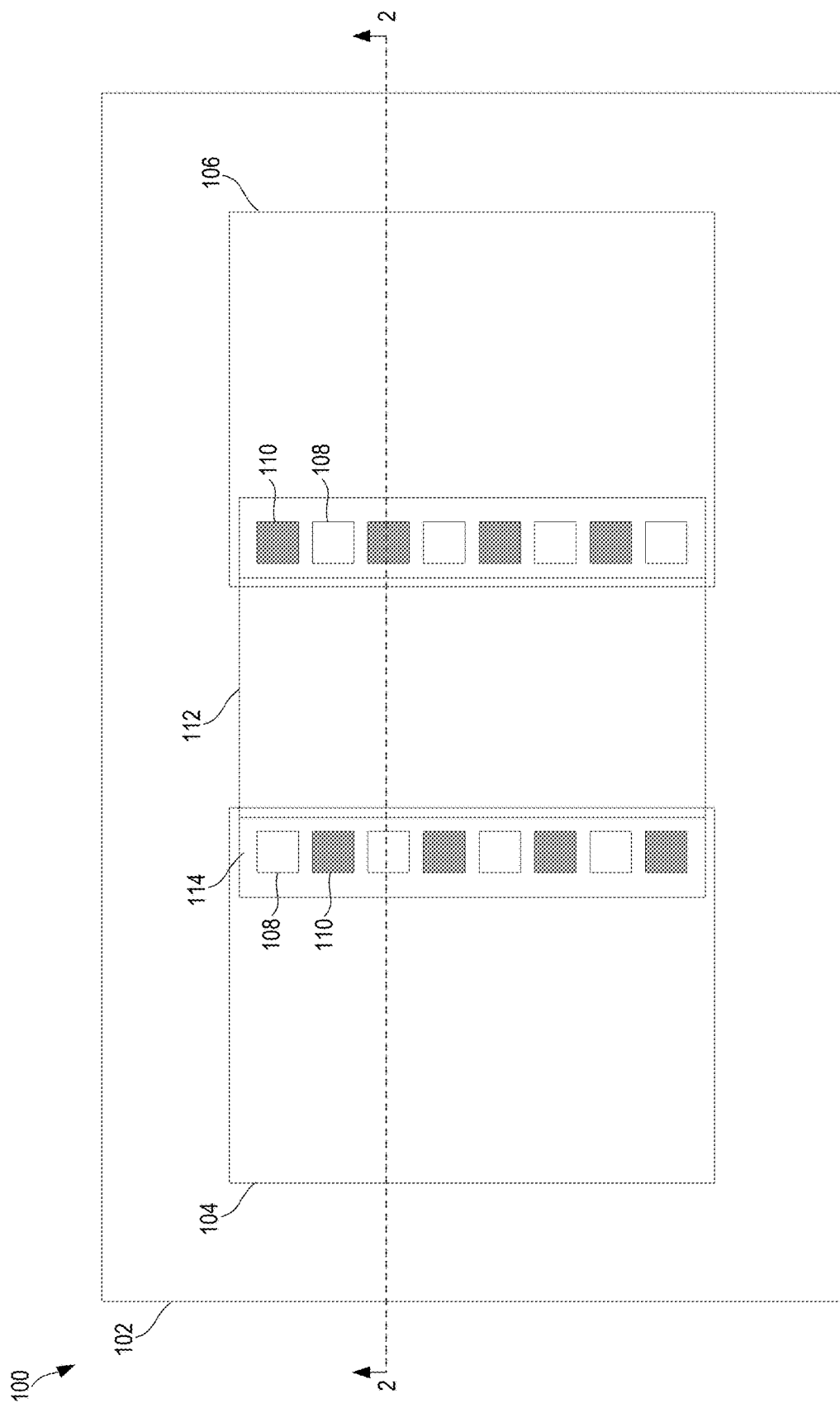
FIG. 1 is a top-down view of a system for chip-to-chip communication with microLEDs and microphotodiodes.

In various embodiments disclosed herein, one or more microLEDs (or micro light-emitting diodes) generate light, and the light is sent to a corresponding microphotodiode. The microLED can be rapidly modulated, allowing it to be used for high-speed data transfer. The microLED and microphotodiode may be on different chips in the same package, allowing for high-speed, low-power chip-to-chip communication. The light from the microLEDs can be sent to the microphotodiodes in any suitable manner, depending on the particular configuration of the microLEDs and microphotodiodes. For example, in one embodiment, light from the microLEDs can be transmitted in a glass bridge to the microphotodiodes. In another embodiment, light from the microLEDs on a first chip can be sent directly to microphotodiodes on a second chip facing the first. In some embodiments, a chip on one surface of a board can transmit light through a hole in the board to a chip on the opposite surface of the board. In another embodiment, a chip on one side of a board can transmit light through a channel created in the board to another chip on the same side of the board.

As used herein, the phrase "communicatively coupled" refers to the ability of a component to send a signal to or receive a signal from another component. The signal can be any type of signal, such as an input signal, an output signal, or a power signal. A component can send or receive a signal to another component to which it is communicatively coupled via a wired or wireless communication medium (e.g., conductive traces, conductive contacts, air). Examples of components that are communicatively coupled include integrated circuit dies located in the same package that communicate via an embedded bridge in a package substrate and an integrated circuit component attached to a printed circuit board that send signals to or receives signals from other integrated circuit components or electronic devices attached to the printed circuit board.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact, and "coupled" may indicate elements co-operate or interact, but they may or may not be in direct physical or electrical contact. Furthermore, the terms "comprising," "including," "having," and the like, as used with respect to embodiments of the present disclosure, are synonymous. Terms modified by the word "substantially" include arrangements, orientations, spacings, or positions that vary slightly from the meaning of the unmodified term. For example, the central axis of a magnetic plug that is substantially coaxially aligned with a through hole may be misaligned from a central axis of the through hole by several degrees. In another example, a substrate assembly feature, such as a through width, that is described as having substantially a listed dimension can vary within a few percent of the listed dimension.

It will be understood that in the examples shown and described further below, the figures may not be drawn to scale and may not include all possible layers and/or circuit components. In addition, it will be understood that although certain figures illustrate transistor designs with source/drain regions, electrodes, etc. having orthogonal (e.g., perpendicular) boundaries, embodiments herein may implement such boundaries in a substantially orthogonal manner (e.g., within +/−5 or 10 degrees of orthogonality) due to fabrication methods used to create such devices or for other reasons.

Reference is now made to the drawings, which are not necessarily drawn to scale, wherein similar or same numbers may be used to designate the same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

As used herein, the phrase "located on" in the context of a first layer or component located on a second layer or component refers to the first layer or component being directly physically attached to the second part or component (no layers or components between the first and second layers or components) or physically attached to the second layer or component with one or more intervening layers or components.

As used herein, the term "adjacent" refers to layers or components that are in physical contact with each other. That is, there is no layer or component between the stated adjacent layers or components. For example, a layer X that is adjacent to a layer Y refers to a layer that is in physical contact with layer Y.

Figure 2:
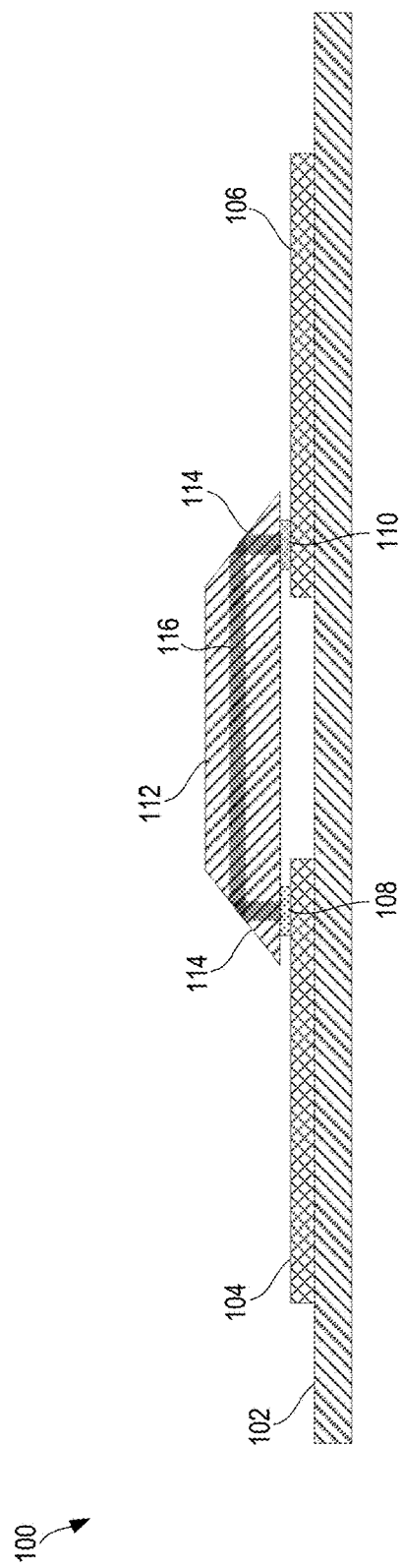
FIG. 2 is a cross-sectional view of the system of FIG. 1.

Referring now to FIGS. 1 and 2, in one embodiment, a system 100 includes a substrate 102 on which a first chip 104 and a second chip 106 are mounted. FIG. 1 shows a top-down view of the system 100, and FIG. 2 shows a cross-sectional side view of the system 100. The first chip 104 includes one or more microLEDs 108 and one or more microphotodiodes 110. Similarly, the second chip 106 includes one or more microLEDs 108 and one or more microphotodiodes 110. A glass optical bridge 112 directs light from the microLEDs 108 on one chip 104, 106 to the microphotodiodes 110 on the other chip 104, 106. In the illustrative embodiment, a beam 116 is transmitted by a microLED 108 towards a surface 114 of the optical bridge 112, which reflects the beam 116 towards another surface 114 on the other side of the optical bridge 112, which in turn reflects the beam 116 towards a microphotodiode 110.

In the illustrative embodiment, each surface 114 has a layer of metamaterial on it, such as a repeating pattern of sub-wavelength nano-scale structures. The metamaterial may reflect the incoming beam 116. In some embodiments, the metamaterial may reflect the beam 116 such that the angle of reflection of the beam 116 is not the same as the angle of incidence of the beam 116. The metamaterial may be tuned to reflect the particular wavelength of the microLEDs 108 at a particular angle. In other embodiments, the surface 114 may be coating with a metallic (e.g., silver, aluminum, gold, etc.) or other reflective layer or the beam 116 may reflect off of the surface 114 in a different manner, such as using total internal reflection.

The substrate 102 may be any suitable substrate. In one embodiment, the substrate 102 may be a circuit board, such as a circuit made from FR-4 or other fiberglass material. In another embodiment, the substrate 102 may be silicon (e.g., a silicon chip), glass, etc. The substrate 102 may have any suitable dimensions, such as a length and/or width of 5-50 millimeters and a thickness of 0.5-5 millimeters.

The illustrative chip 104 is a silicon integrated circuit chip. The chip 104 may include one or more transistors, memory cells, or other integrated circuit components. The chip 104 may be part of a processor, a network processor, a graphics processor, a memory device, or any other suitable integrated circuit chip. The chip 106 may be similar to the chip 104.

The microLED 108 may be any suitable microLED, such as gallium nitride microLEDs 108, quantum dot LEDs, single nanowire LED, etc. As used herein, a microLED refers to a light-emitting diode with a length and width of a light-emitting surface of less than 100 micrometers. In some embodiments, the length and/or width of a light-emitting surface of the microLEDs 108 may be smaller, such as less than 10-50 micrometers. In the illustrative embodiment, the microLEDs 108 are created on a separate substrate and transferred to the chips 104, 106, as described in more detail below in regard to FIG. 11.

The microLED 108 may have any suitable wavelength, such as 400-1,500 nanometers, depending on the particular material and structure of the microLED 108. In the illustrative embodiment, the microLED 108 may be between, e.g., 450-700 nanometers. The microLED 108 may have any suitable bandwidth, such as 1-15 nanometers.

In the illustrative embodiment, the microphotodiodes 110 are spaced apart from other microphotodiodes 110 and/or from microLEDs 108 in order to prevent cross-talk. The microphotodiodes 110 and/or microLEDs 108 may be spaced apart by, e.g., 10-500 micrometers, as measured from the center of one microphotodiode 110 and/or microLED 108 to the next. In some embodiments, the microphotodiodes 110 may be responsive to a similar wavelength range as a corresponding microLED 108, and different microLEDs 108 may have different wavelength ranges. In such embodiments, the microphotodiodes 110 could be positioned closer together, within overlapping beams 116 from different microLEDs 108 with different wavelengths. If the microphotodiodes 110 are only sensitive to light from one microLED 108 with a beam 116 that hits the microphotodiode 110, then there would be no cross-talk. As such, in such an embodiment, the microphotodiodes 110 and/or microLEDs 108 can be spaced closer together than they otherwise would be able to be.

In one embodiment, the microphotodiodes 110 may be similar to or the same as the microLEDs 108, with an opposite bias to detect light rather than create it. As used herein, a microphotodiode 110 refers to a photodiode with a length and width of a light-sensitive surface of less than 100 micrometers. In some embodiments, the length and/or width of a light-sensitive surface of the microphotodiodes 110 may be smaller, such as less than 10-50 micrometers. Similar to the microLEDs 108, the microphotodiodes 110 may be created on a separate substrate and transferred to the chips 104, 106, as described in more detail below in regard to FIG. 11. In some embodiments, the microphotodiodes 110 may be able to be used as microLEDs 108 and/or the microLEDs 108 may be able to be used as microphotodiodes 110. In the illustrative embodiment, each microLED 108 and microphotodiode 110 interfaces with the chips 104, 106 through a copper pad on the chips 104, 106 and a transparent electrode on top of the microLED 108 or microphotodiode 110. The transparent electrode may be any suitable transparent conductive material, such as indium tin oxide (ITO).

In the illustrative embodiment, each microLED 108 has a corresponding microphotodiode 110 next to it on the same chip 104, 106, creating a transmit/receive pair. In other embodiments, a chip 104, 106 may have more receive channels or more transmit channels. Each microLED 108 and microphotodiode 110 is connected to a drive and receive circuit, respectively, that interfaces with other electronic components of the corresponding chip 104, 106. In some embodiments, the drive and/or receive circuit may be or otherwise include a single transistor. The chips 104, 106 may include any suitable number of microLEDs 108 and/or microphotodiodes, such as 1-10,000. Each microLED 108 may transmit (and each microphotodiode may receive) data at a rate of, e.g., 1-2 gigabits per second. In the illustrative embodiment, the microLED 108 sends data by modulating the microLED 108 on and off. In other embodiments, the microLED 108 may send data with a different encoding, such as a multi-level coding, phase shift keying, quadrature amplitude modulation, etc. In the illustrative embodiment, data can be transferred by a microLED 108 to a microphotodiode 110 with an energy efficiency of less than 0.5 picojoules per bit over a range of up to, e.g., 1-5 meters. In other embodiments, data can be transferred by a microLED 108 to a microphotodiode 110 with an energy efficiency of, e.g., less than 0.5-5 picojoules per bit. For comparison, electrical components may transfer data at an energy efficiency of, e.g., 0.1 picojoules per bit per millimeter. As such, in one embodiment, transferring data using a microLED 108 and a microphotodiode 110 may be more efficient than using an electrical connection over a distance of more than 5 millimeters.

In one embodiment, each chip 104, 106 includes the microLEDs 108 and microphotodiodes 110 in a linear array, as shown in FIG. 1. In other embodiments, each chip 104, 106 may array the microLEDs 108 and microphotodiodes 110 in a two-dimensional array, such as an array with a length and/or width of 1-1,000 microLEDs 108 or microphotodiodes 110.

In the illustrative embodiment, the beam 116 from a microLED 108 is relatively narrow, and a relatively large amount of the beam 116 is directed on the microphotodiode 110. The microLED 108 may have a structure that leads to an intrinsically narrow beam 116, or a lens or similar structure may collimate the light from the microLED into a beam 116.

In the illustrative embodiment, the optical bridge 112 is made of glass. In other embodiments, the optical bridge 112 may be made of any suitable material transparent to the light from the micro LEDs 108, such as plastic, fused silica, etc. The optical bridge 112 may have any suitable length (as measured along the direction of the beam 116), such as 1 millimeter to 1 meter. A longer optical bridge 112 may be used if, e.g., the microLED 108 and corresponding microphotodiode 110 are chips 104, 106 on separate devices, as opposed to chips 104, 106 on the same substrate 102. The optical bridge 112 may have any suitable width, such as 10 micrometers up to 5 millimeters, depending on the width of the array of microLEDs 108 and microphotodiodes 110. The optical bridge 112 may have any suitable height, such as 100 micrometers to 10 millimeters.

In the embodiment shown in FIGS. 1 and 2, the chips 104, 106 are on the same substrate 102. For example, a single package or system-on-a-chip may include the substrate 102 and the chips 104, 106, or the chips 104, 106 may be mounted on a motherboard or similar circuit board.

In other embodiments, the microLEDs 108 and corresponding microphotodiode 110 may be on different parts of the same chip or may be on different packages, or the microphotodiode 110 may be on a remote device relative to a device that the corresponding microLED 108 is on, such as different blades of a rack in a data center.

Figure 3:
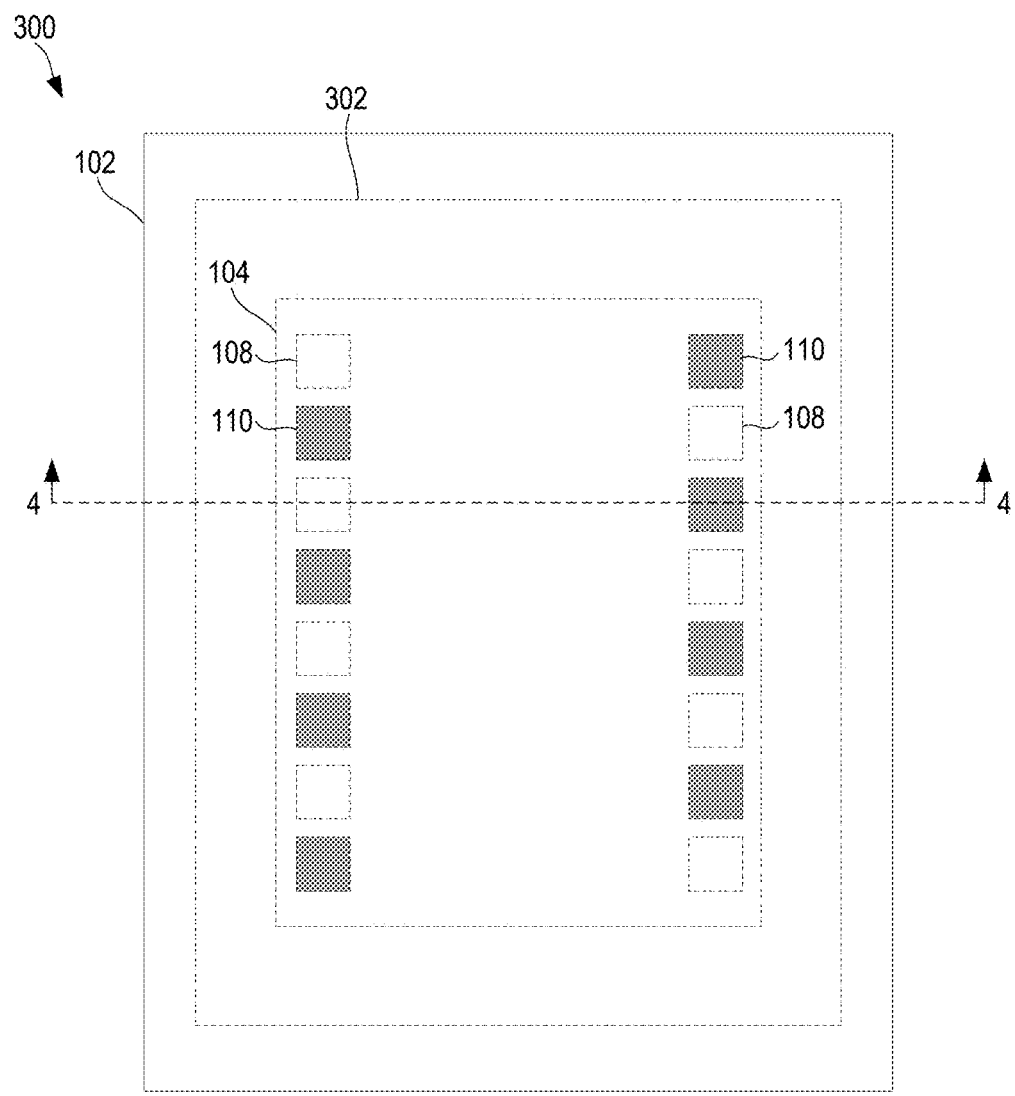
FIG. 3 is a top-down view of a system for chip-to-chip communication with microLEDs and microphotodiodes.
Figure 4:
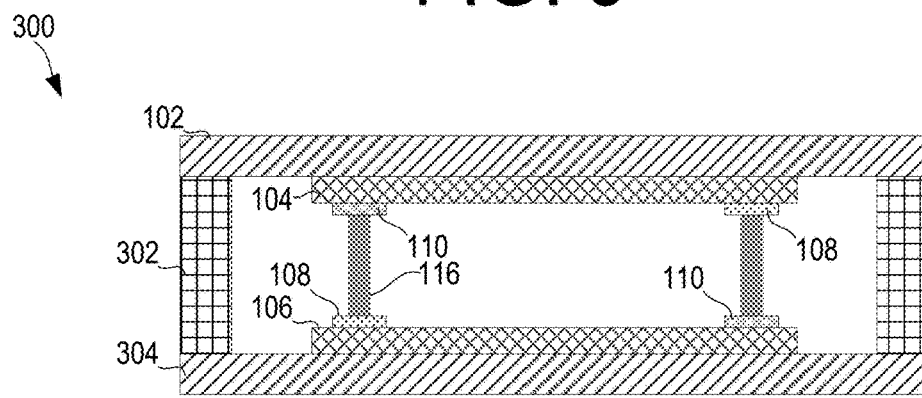
FIG. 4 is a cross-sectional view of the system of FIG. 3.

Referring now to FIGS. 3 and 4, in one embodiment, a system 300 includes a substrate 102 on which a first chip 104 is mounted and a substrate 304 on which a second chip 106 in mounted. FIG. 3 shows a top-down view of the system 300, and FIG. 4 shows a cross-sectional view of the system 300. Various components of the system 300 (and systems 500, 700, 800, 900, etc.) may be similar to those of the system 100. For example, the substrate 102, the chip 104, the microLED 108, the microphotodiode 110, etc., of the system 300 may be similar or the same as the corresponding component of the system 100. A description of those components will not be repeated in the interest of clarity.

In the system 100, the chip 106 on the substrate 304 is flipped in the opposite orientation of the chip 104, such that the beams 116 from the microLEDs 108 on the top of one chip 104, 106 are pointed directly at the corresponding microphotodiodes 110 on the top of the other chip 104, 106. As such, no optical bridge is required to couple the beam 116 from a microLED 108 to the corresponding microphotodiode 110. In the illustrative embodiment, a frame 302 holds the chips 104, 106 in place relative to each other. The frame 302 may be any suitable material, such as metal, plastic, etc. In some embodiments, the frame 302 may fully enclose the chips 104, 106, such as in a closed package. In other embodiments, the frame 302 may have gaps for, e.g., other connections, airflow, etc. The chips 104, 106 may be any suitable distance from each other, such as 5-1,000 millimeters.

Figure 5:
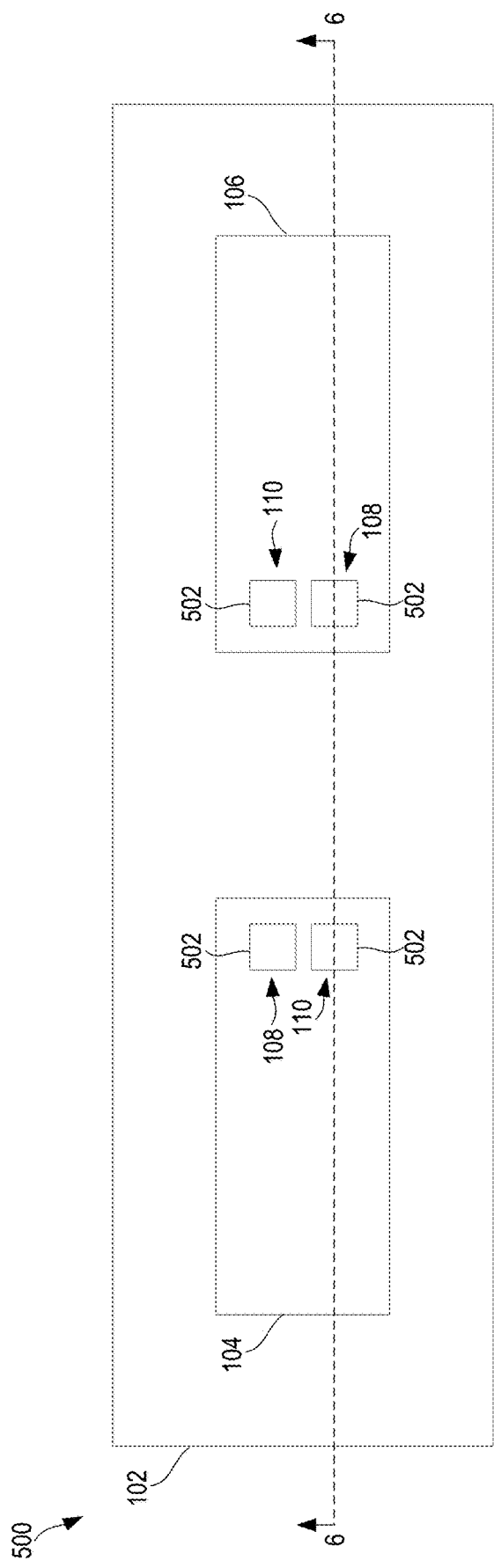
FIG. 5 is a top-down view of a system for chip-to-chip communication with microLEDs and microphotodiodes.
Figure 6:
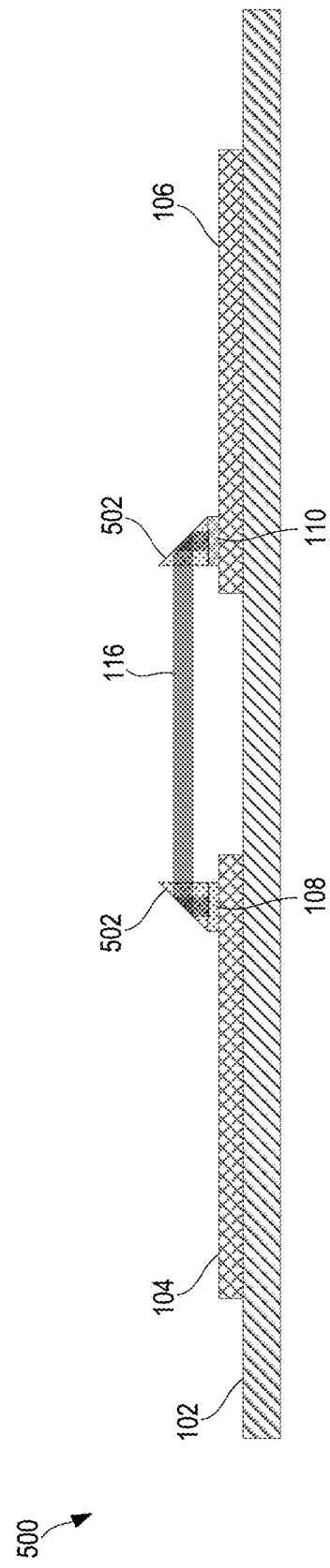
FIG. 6 is a cross-sectional view of the system of FIG. 3.

Referring now to FIGS. 5 and 6, in one embodiment, a system 500 includes a substrate 102 on which a first chip 104 and a second chip 106 are mounted. FIG. 5 shows a top-down view of the system 500, and FIG. 6 shows a cross-sectional view of the system 500. In the illustrative embodiment, a microprism 502 may be positioned on each microLED 108 and microphotodiode 110. The microprism 502 on a microLED 108 may reflect the beam 116 from the microLED 108 towards a microphotodiode 110, and the microprism 502 on a microphotodiode 110 may reflect the beam 116 from a microLED 108 to the microphotodiode 110 as shown. The beam 116 may reflect off the surface of the microprism 502 based on, e.g., total internal reflection, a metamaterial structure on the surface, a metallic or other reflective coating on the surface, etc. In some embodiments, a chip 104, 106 may include a small number of microLEDs 108 and/or microphotodiodes 110 with microprisms 502, such as 1-4 microLEDs 108 and/or microphotodiodes 110. In other embodiments, the chips 104, 106 may include a larger number of microLEDs 108 and/or microphotodiodes 110 with microprisms 502, such as 5-10,000 microLEDs 108 and/or microphotodiodes 110.

The microprism 502 may be any suitable material, such as glass, silicon dioxide, fused silica, or plastic. The microprism 502 may have any suitable dimensions, such as a length, width, or height from 10-100 micrometers.

Referring now to FIG. 7 in one embodiment, a system 700 includes a substrate 102 on which a first chip 104 and a second chip 106 are mounted. FIG. 7 shows a cross-sectional view of the system 700. In the illustrative embodiment, a first chip 104 is mounted on a top surface 704 of the substrate 102, and a second chip 106 is mounted on a bottom surface of the substrate 102. A channel 706 is created in the substrate 102, allowing a beam 116 to travel from a microLED 108 of the first chip 104 to a microphotodiode 110 of the second chip 106. Additionally or alternatively, a beam 116 may travel from a microLED 108 of the second chip 106 to a microphotodiode 110 of the first chip 106. In the illustrative embodiment, the channel 706 is not filled with any material except air. In another embodiment, as shown in FIG. 8, a system 800 may have a channel 802 through the substrate 102 that is filled with any suitable material, such as a transparent dielectric, such as glass.

Figure 10:
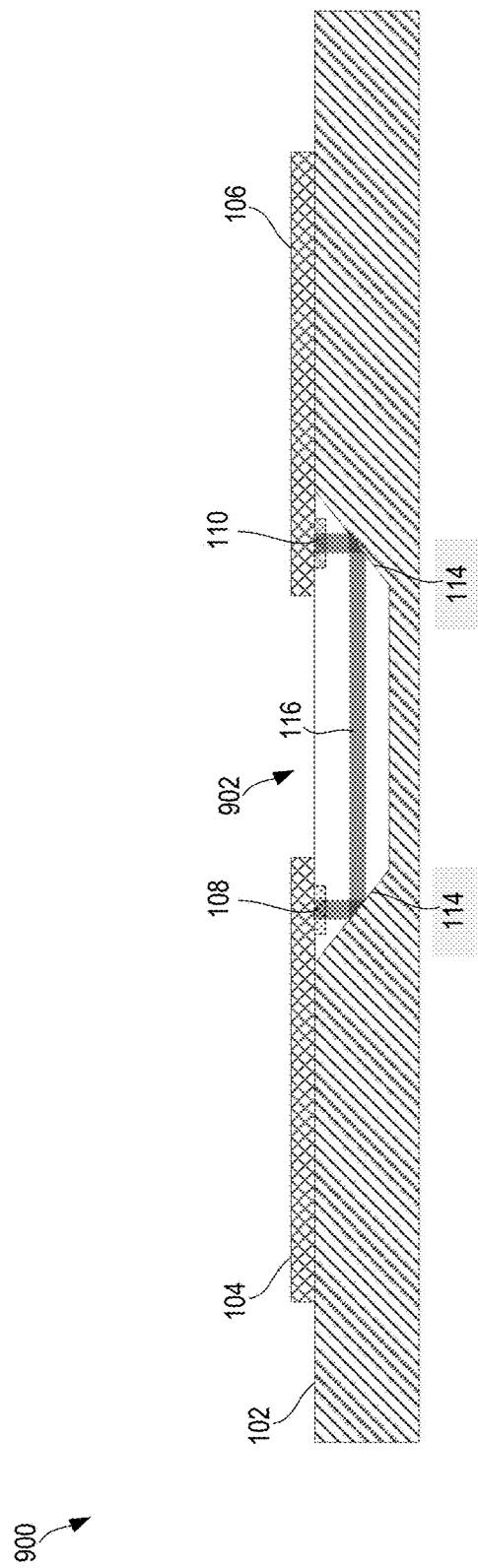
FIG. 10 is a cross-sectional view of the system of FIG. 9.

Referring now to FIGS. 9 and 10, in one embodiment, a system 900 includes a substrate 102 on which a first chip 104 and a second chip 106 are mounted. FIG. 9 shows a top-down view of the system 900, and FIG. 10 shows a cross-sectional view of the system 900. In the illustrative embodiment, the first chip 104 and the second chip 106 are mounted on the same side of the substrate 102, such as on the top surface. As used herein, the "top surface" refers to an outer surface of the substrate 102 and may, in some embodiments, be, e.g., a bottom surface or side surface of the substrate 102, depending on the orientation of the substrate 102. The illustrative substrate 102 is much thinner in one dimension than the other two, and the top surface refers to a surface extending along the two larger dimensions of the substrate 102. A channel 902 is defined in the substrate 102, allowing beams 116 to pass from microLEDs 108 of the chips 104, 106 to microphotodiodes 110 of the chips 106, 104. Reflective surfaces 114 reflect the beams 116 as shown in FIG. 10. The channel 902 may be filled with air or another dielectric such as glass. In one embodiment, reflective surfaces 114 may be reflective because of a metamaterial on the surface, creating a metamirror. In other embodiments, the reflective surfaces 114 may have a reflective metal or other coating on them to reflect light.

Figure 11:
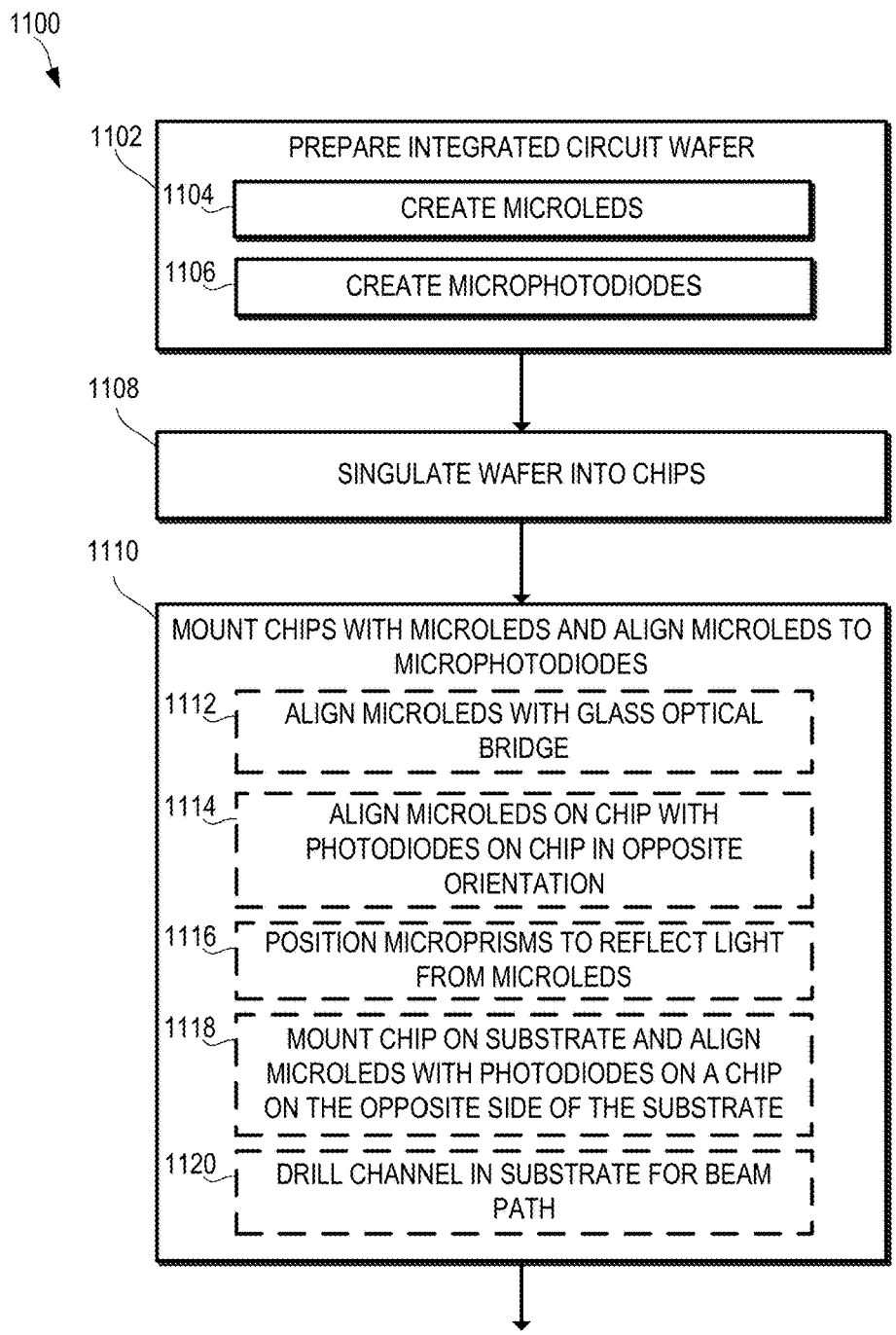
FIG. 11 is a simplified flow diagram of at least one embodiment of a method for manufacturing a system for chip-to-chip communication with microLEDs and microphotodiodes.

Referring now to FIG. 11, in one embodiment, a flowchart for a method 1100 for creating the system 100, 300, 500, 700, 800, or 900 is shown. The method 1100 may be executed by a technician and/or by one or more automated machines. In some embodiments, one or more machines may be programmed to do some or all of the steps of the method 1100. Such a machine may include, e.g., a memory, a processor, data storage, etc. The memory and/or data storage may store instructions that, when executed by the machine, causes the machine to perform some or all of the steps of the method 1100. The method 1100 may use any suitable set of techniques that are used in semiconductor processing, such as chemical vapor deposition, atomic layer deposition, physical layer deposition, molecular beam epitaxy, layer transfer, photolithography, ion implantation, dry etching, wet etching, thermal treatments, flip chip, layer transfer, magnetron sputter deposition, pulsed laser deposition, etc. It should be appreciated that the method 1100 is merely one embodiment of a method to create the system 100, 300, 500, 700, 800, or 900, and other methods may be used to create the system 100, 300, 500, 700, 800, or 900. In some embodiments, steps of the method 1100 may be performed in a different order than that shown in the flowchart.

The method 1100 begins in block 1102, in which a wafer of integrated circuits is prepared. The wafer may include, e.g., more transistors, memory cells, electrical connections, or other integrated circuit components, etc. As part of preparing the wafer, in the illustrative embodiment, microLEDs 108 are created in block 1104 and mounted on the wafer. Similarly, microphotodiodes 110 are created in block 1106 and mounted on the wafer. In the illustrative embodiment, the microLEDs 108 and/or microphotodiodes 110 are created on a separate substrate, such as a sapphire substrate. An electrode (such as copper) is patterned on the microLEDs 108 and/or microphotodiodes 110. The wafer of microLEDs 108 and/or microphotodiodes 110 can then be flipped onto the wafer of integrated circuits. Some or all of the microLEDs 108 and/or microphotodiodes 110 can be transferred, such as by using one or more lasers to separate the microLEDs 108 and/or microphotodiodes 110 from the sapphire substrate and bond the microLEDs 108 and/or microphotodiodes 110 to the integrated circuit wafer. Although the process described transfers microLEDs 108 and/or microphotodiodes from a wafer to a wafer, in other embodiments, microLEDs 108 and/or microphotodiodes may be transferred from a die to a wafer, from a wafer to a die, or from a die to a die.

In block 1108, the wafer is singulated into several chips 104, 106 (or dies 104, 106). In block 1110, the chips 104, 106 are mounted on a substrate 102 and aligned, such as by aligning microLEDs 108 to microphotodiodes 110 on other chips and/or by aligning microphotodiodes 110 to microLEDs 108 on other chips. In block 1112, microLEDs 108 are aligned using a glass optical bridge, as described above in regard to FIGS. 1 and 2. The glass optical bridge may be placed using, e.g., pick and place. In block 1114, microLEDs 108 of a first chip are aligned with microphotodiodes 110 on a second chip facing the first, such as is shown in FIGS. 3 and 4. In block 1116, microprisms 502 are positioned to reflect light from microLEDs 108 to microphotodiodes 110. The microprisms 502 may be positioned using pick and place. In some embodiments, the microprisms 502 may be fabricated using grayscale lithography. In block 1118, a chip is mounted on a substrate 102, and microLEDs 108 of the chip are aligned with microphotodiodes 110 of a chip on the other side of the substrate, as shown in FIGS. 7 and 8.

In block 1120, a channel is drilled or otherwise created in a substrate 102, allowing a beam 116 from a microLED 108 on a chip to pass through the channel in the substrate to be aligned with a microphotodiode on another chip mounted on the substrate 102, as shown in FIGS. 9 and 10.

Although the examples described above in blocks 1112-1120 refer to aligning microLEDs 108 to microphotodiodes 110, it should be appreciated that microphotodiodes 110 may be aligned to microLEDs 108 in a similar manner.

Figure 12:
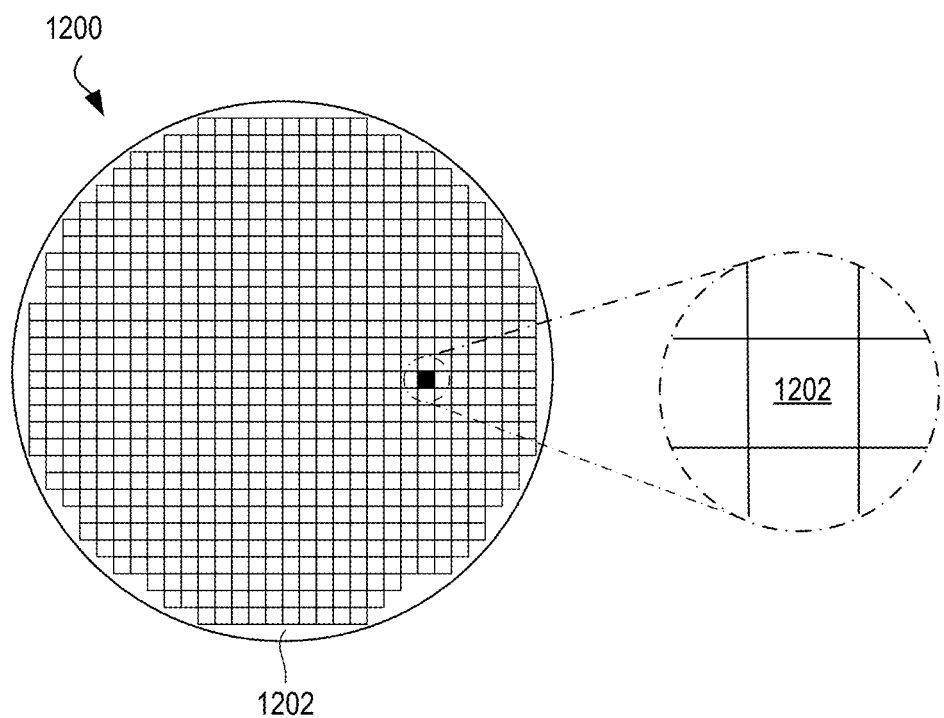
FIG. 12 is a top view of a wafer and dies that may be included in a microelectronic assembly, in accordance with any of the embodiments disclosed herein.

FIG. 12 is a top view of a wafer 1200 and dies 1202 that may be included in any of the systems 100 disclosed herein (e.g., as any suitable ones of the chips 104, 106). The wafer 1200 may be composed of semiconductor material and may include one or more dies 1202 having integrated circuit structures formed on a surface of the wafer 1200. The individual dies 1202 may be a repeating unit of an integrated circuit product that includes any suitable integrated circuit. After the fabrication of the semiconductor product is complete, the wafer 1200 may undergo a singulation process in which the dies 1202 are separated from one another to provide discrete "chips" of the integrated circuit product. The die 1202 may be any of the chips 104, 106 disclosed herein. The die 1202 may include one or more transistors (e.g., some of the transistors 1340 of FIG. 13, discussed below), supporting circuitry to route electrical signals to the transistors, passive components (e.g., signal traces, resistors, capacitors, or inductors), and/or any other integrated circuit components. In some embodiments, the wafer 1200 or the die 1202 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1202. For example, a memory array formed by multiple memory devices may be formed on a same die 1202 as a processor unit (e.g., the processor unit 1602 of FIG. 16) or other logic that is configured to store information in the memory devices or execute instructions stored in the memory array. Various ones of the systems 100, 300, etc. disclosed herein may be manufactured using a die-to-wafer assembly technique in which some chips 104, 106 are attached to a wafer 1200 that include others of the chips 104, 106, and the wafer 1200 is subsequently singulated.

Figure 13:
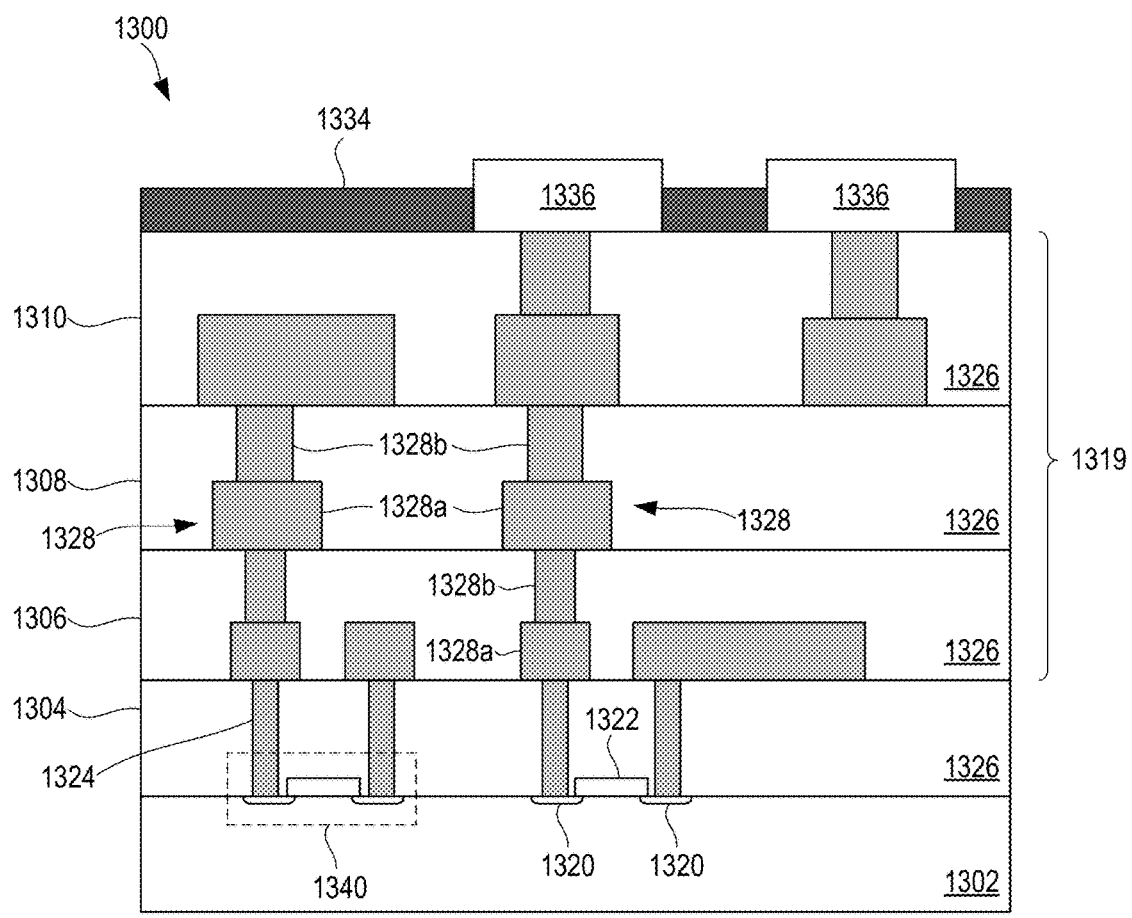
FIG. 13 is a cross-sectional side view of an integrated circuit device that may be included in a microelectronic assembly, in accordance with any of the embodiments disclosed herein.

FIG. 13 is a cross-sectional side view of an integrated circuit device 1300 that may be included in any of the systems disclosed herein (e.g., in any of the chips 104, 106). One or more of the integrated circuit devices 1300 may be included in one or more dies 1202 (FIG. 12). The integrated circuit device 1300 may be formed on a die substrate 1302 (e.g., the wafer 1200 of FIG. 12) and may be included in a die (e.g., the die 1202 of FIG. 12). The die substrate 1302 may be a semiconductor substrate composed of semiconductor material systems including, for example, n-type or p-type materials systems (or a combination of both). The die substrate 1302 may include, for example, a crystalline substrate formed using a bulk silicon or a silicon-on-insulator (SOI) substructure. In some embodiments, the die substrate 1302 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 1302. Although a few examples of materials from which the die substrate 1302 may be formed are described here, any material that may serve as a foundation for an integrated circuit device 1300 may be used. The die substrate 1302 may be part of a singulated die (e.g., the dies 1202 of FIG. 12) or a wafer (e.g., the wafer 1200 of FIG. 12).

The integrated circuit device 1300 may include one or more device layers 1304 disposed on the die substrate 1302. The device layer 1304 may include features of one or more transistors 1340 (e.g., metal oxide semiconductor field-effect transistors (MOSFETs)) formed on the die substrate 1302. The transistors 1340 may include, for example, one or more source and/or drain (S/D) regions 1320, a gate 1322 to control current flow between the S/D regions 1320, and one or more S/D contacts 1324 to route electrical signals to/from the S/D regions 1320. The transistors 1340 may include additional features not depicted for the sake of clarity, such as device isolation regions, gate contacts, and the like. The transistors 1340 are not limited to the type and configuration depicted in FIG. 13 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon, nanosheet, or nanowire transistors.

FIGS. 14A-14D are simplified perspective views of example planar, FinFET, gate-all-around, and stacked gate-all-around transistors. The transistors illustrated in FIGS. 14A-14D are formed on a substrate 1416 having a surface 1408. Isolation regions 1414 separate the source and drain regions of the transistors from other transistors and from a bulk region 1418 of the substrate 1416.

Figure 14A:
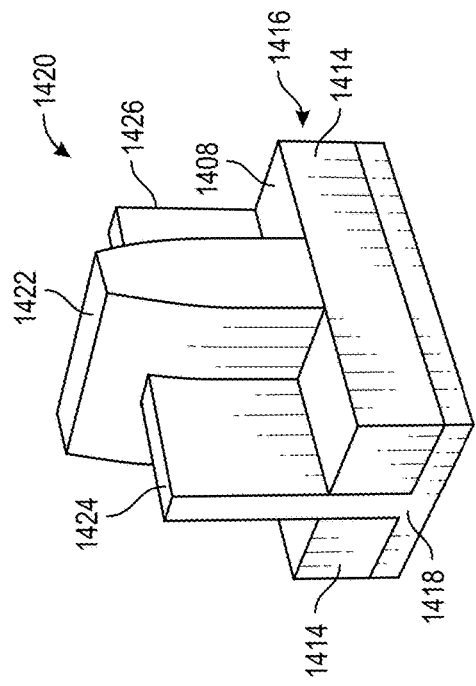
FIGS. 14A-14D are perspective views of example planar, gate-all-around, and stacked gate-all-around transistors.

FIG. 14A is a perspective view of an example planar transistor 1400 comprising a gate 1402 that controls current flow between a source region 1404 and a drain region 1406. The transistor 1400 is planar in that the source region 1404 and the drain region 1406 are planar with respect to the substrate surface 1408.

Figure 14B:
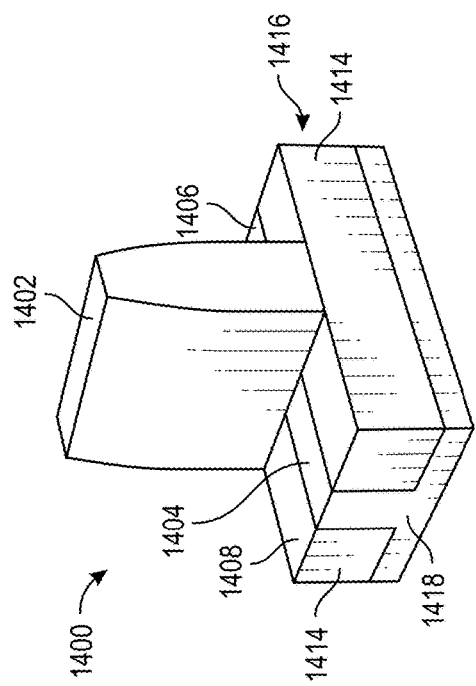

FIG. 14B is a perspective view of an example FinFET transistor 1420 comprising a gate 1422 that controls current flow between a source region 1424 and a drain region 1426. The transistor 1420 is non-planar in that the source region 1424 and the drain region 1426 comprise "fins" that extend upwards from the substrate surface 1428. As the gate 1422 encompasses three sides of the semiconductor fin that extends from the source region 1424 to the drain region 1426, the transistor 1420 can be considered a tri-gate transistor. FIG. 14B illustrates one S/D fin extending through the gate 1422, but multiple S/D fins can extend through the gate of a FinFET transistor.

Figure 14C:
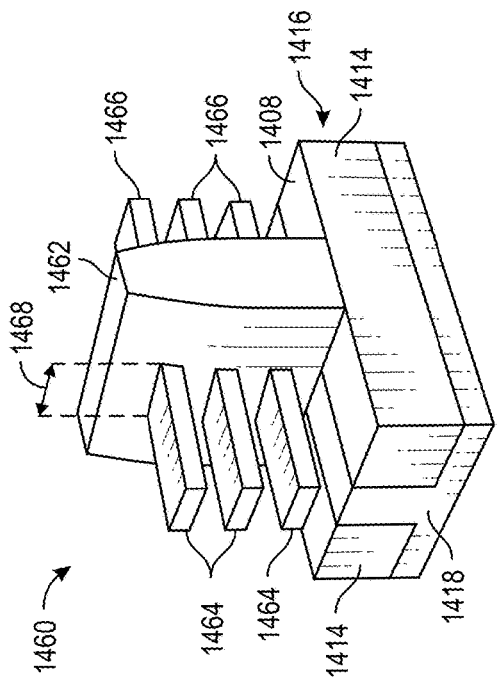

FIG. 14C is a perspective view of a gate-all-around (GAA) transistor 1440 comprising a gate 1442 that controls current flow between a source region 1444 and a drain region 1446. The transistor 1440 is non-planar in that the source region 1444 and the drain region 1446 are elevated from the substrate surface 1428.

Figure 14D:
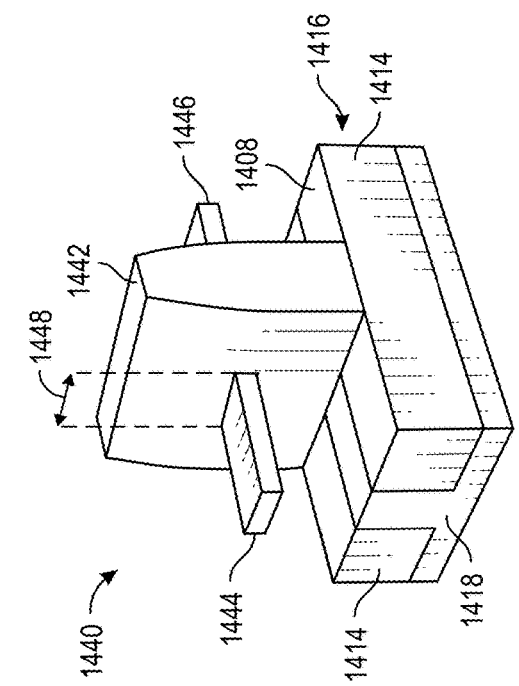

FIG. 14D is a perspective view of a GAA transistor 1460 comprising a gate 1462 that controls current flow between multiple elevated source regions 1464 and multiple elevated drain regions 1466. The transistor 1460 is a stacked GAA transistor as the gate controls the flow of current between multiple elevated S/D regions stacked on top of each other. The transistors 1440 and 1460 are considered gate-all-around transistors as the gates encompass all sides of the semiconductor portions that extends from the source regions to the drain regions. The transistors 1440 and 1460 can alternatively be referred to as nanowire, nanosheet, or nanoribbon transistors depending on the width (e.g., widths 1448 and 1468 of transistors 1440 and 1460, respectively) of the semiconductor portions extending through the gate.

Returning to FIG. 13, a transistor 1340 may include a gate 1322 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 1340 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 1340 along the source-channel-drain direction, the gate electrode may consist of a U-shaped structure that includes a bottom portion substantially parallel to the surface of the die substrate 1302 and two sidewall portions that are substantially perpendicular to the top surface of the die substrate 1302. In other embodiments, at least one of the metal layers that form the gate electrode may simply be a planar layer that is substantially parallel to the top surface of the die substrate 1302 and does not include sidewall portions substantially perpendicular to the top surface of the die substrate 1302. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 1320 may be formed within the die substrate 1302 adjacent to the gate 1322 of individual transistors 1340. The S/D regions 1320 may be formed using an implantation/diffusion process or an etching/deposition process, for example. In the former process, dopants such as boron, aluminum, antimony, phosphorous, or arsenic may be ion-implanted into the die substrate 1302 to form the S/D regions 1320. An annealing process that activates the dopants and causes them to diffuse farther into the die substrate 1302 may follow the ion-implantation process. In the latter process, the die substrate 1302 may first be etched to form recesses at the locations of the S/D regions 1320. An epitaxial deposition process may then be carried out to fill the recesses with material that is used to fabricate the S/D regions 1320. In some implementations, the S/D regions 1320 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1320 may be formed using one or more alternate semiconductor materials such as germanium or a group III-V material or alloy. In further embodiments, one or more layers of metal and/or metal alloys may be used to form the S/D regions 1320.

Electrical signals, such as power and/or input/output (I/O) signals, may be routed to and/or from the devices (e.g., transistors 1340) of the device layer 1304 through one or more interconnect layers disposed on the device layer 1304 (illustrated in FIG. 13 as interconnect layers 1306-1310). For example, electrically conductive features of the device layer 1304 (e.g., the gate 1322 and the S/D contacts 1324) may be electrically coupled with the interconnect structures 1328 of the interconnect layers 1306-1310. The one or more interconnect layers 1306-1310 may form a metallization stack (also referred to as an "ILD stack") 1319 of the integrated circuit device 1300.

The interconnect structures 1328 may be arranged within the interconnect layers 1306-1310 to route electrical signals according to a wide variety of designs; in particular, the arrangement is not limited to the particular configuration of interconnect structures 1328 depicted in FIG. 13. Although a particular number of interconnect layers 1306-1310 is depicted in FIG. 13, embodiments of the present disclosure include integrated circuit devices having more or fewer interconnect layers than depicted.

In some embodiments, the interconnect structures 1328 may include lines 1328a and/or vias 1328b filled with an electrically conductive material such as a metal. The lines 1328a may be arranged to route electrical signals in a direction of a plane that is substantially parallel with a surface of the die substrate 1302 upon which the device layer 1304 is formed. The vias 1328b may be arranged to route electrical signals in a direction of a plane that is substantially perpendicular to the surface of the die substrate 1302 upon which the device layer 1304 is formed. In some embodiments, the vias 1328b may electrically couple lines 1328a of different interconnect layers 1306-1310 together.

The interconnect layers 1306-1310 may include a dielectric material 1326 disposed between the interconnect structures 1328, as shown in FIG. 13. In some embodiments, dielectric material 1326 disposed between the interconnect structures 1328 in different ones of the interconnect layers 1306-1310 may have different compositions; in other embodiments, the composition of the dielectric material 1326 between different interconnect layers 1306-1310 may be the same. The device layer 1304 may include a dielectric material 1326 disposed between the transistors 1340 and a bottom layer of the metallization stack as well. The dielectric material 1326 included in the device layer 1304 may have a different composition than the dielectric material 1326 included in the interconnect layers 1306-1310; in other embodiments, the composition of the dielectric material 1326 in the device layer 1304 may be the same as a dielectric material 1326 included in any one of the interconnect layers 1306-1310.

A first interconnect layer 1306 (referred to as Metal 1 or "M1") may be formed directly on the device layer 1304. In some embodiments, the first interconnect layer 1306 may include lines 1328a and/or vias 1328b, as shown. The lines 1328a of the first interconnect layer 1306 may be coupled with contacts (e.g., the S/D contacts 1324) of the device layer 1304. The vias 1328b of the first interconnect layer 1306 may be coupled with the lines 1328a of a second interconnect layer 1308.

The second interconnect layer 1308 (referred to as Metal 2 or "M2") may be formed directly on the first interconnect layer 1306. In some embodiments, the second interconnect layer 1308 may include via 1328b to couple the lines 1328 of the second interconnect layer 1308 with the lines 1328a of a third interconnect layer 1310. Although the lines 1328a and the vias 1328b are structurally delineated with a line within individual interconnect layers for the sake of clarity, the lines 1328a and the vias 1328b may be structurally and/or materially contiguous (e.g., simultaneously filled during a dual-damascene process) in some embodiments.

The third interconnect layer 1310 (referred to as Metal 3 or "M3") (and additional interconnect layers, as desired) may be formed in succession on the second interconnect layer 1308 according to similar techniques and configurations described in connection with the second interconnect layer 1308 or the first interconnect layer 1306. In some embodiments, the interconnect layers that are "higher up" in the metallization stack 1319 in the integrated circuit device 1300 (i.e., farther away from the device layer 1304) may be thicker that the interconnect layers that are lower in the metallization stack 1319, with lines 1328a and vias 1328b in the higher interconnect layers being thicker than those in the lower interconnect layers.

The integrated circuit device 1300 may include a solder resist material 1334 (e.g., polyimide or similar material) and one or more conductive contacts 1336 formed on the interconnect layers 1306-1310. In FIG. 13, the conductive contacts 1336 are illustrated as taking the form of bond pads. The conductive contacts 1336 may be electrically coupled with the interconnect structures 1328 and configured to route the electrical signals of the transistor(s) 1340 to external devices. For example, solder bonds may be formed on the one or more conductive contacts 1336 to mechanically and/or electrically couple an integrated circuit die including the integrated circuit device 1300 with another component (e.g., a printed circuit board). The integrated circuit device 1300 may include additional or alternate structures to route the electrical signals from the interconnect layers 1306-1310; for example, the conductive contacts 1336 may include other analogous features (e.g., posts) that route the electrical signals to external components.

In some embodiments in which the integrated circuit device 1300 is a double-sided die, the integrated circuit device 1300 may include another metallization stack (not shown) on the opposite side of the device layer(s) 1304. This metallization stack may include multiple interconnect layers as discussed above with reference to the interconnect layers 1306-1310, to provide conductive pathways (e.g., including conductive lines and vias) between the device layer(s) 1304 and additional conductive contacts (not shown) on the opposite side of the integrated circuit device 1300 from the conductive contacts 1336.

In other embodiments in which the integrated circuit device 1300 is a double-sided die, the integrated circuit device 1300 may include one or more through silicon vias (TSVs) through the die substrate 1302; these TSVs may make contact with the device layer(s) 1304, and may provide conductive pathways between the device layer(s) 1304 and additional conductive contacts (not shown) on the opposite side of the integrated circuit device 1300 from the conductive contacts 1336. In some embodiments, TSVs extending through the substrate can be used for routing power and ground signals from conductive contacts on the opposite side of the integrated circuit device 1300 from the conductive contacts 1336 to the transistors 1340 and any other components integrated into the die 1300, and the metallization stack 1319 can be used to route I/O signals from the conductive contacts 1336 to transistors 1340 and any other components integrated into the die 1300.

Multiple integrated circuit devices 1300 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 15:
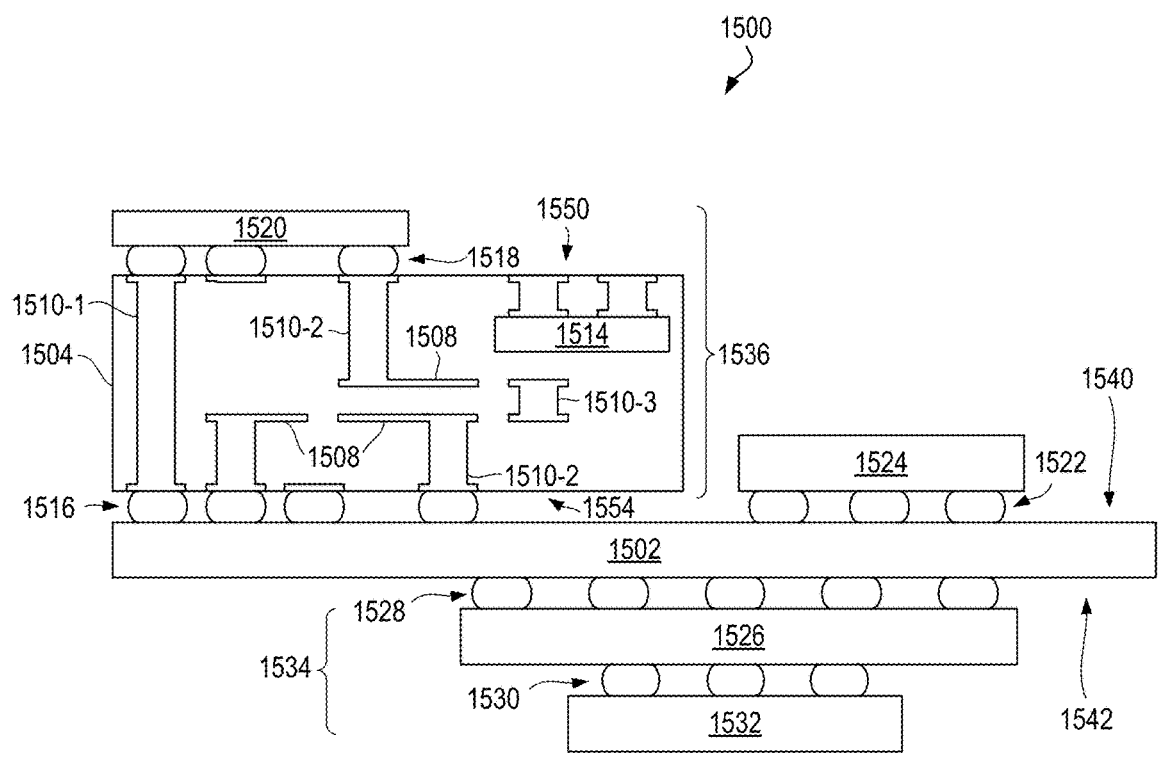
FIG. 15 is a cross-sectional side view of an integrated circuit device assembly that may include a microelectronic assembly, in accordance with any of the embodiments disclosed herein.

FIG. 15 is a cross-sectional side view of an integrated circuit device assembly 1500. The integrated circuit device assembly 1500 includes a number of components disposed on a circuit board 1502 (which may be a motherboard, system board, mainboard, etc.). The integrated circuit device assembly 1500 includes components disposed on a first face 1540 of the circuit board 1502 and an opposing second face 1542 of the circuit board 1502; generally, components may be disposed on one or both faces 1540 and 1542. Any of the integrated circuit components discussed below with reference to the integrated circuit device assembly 1500 may take the form of any suitable ones of the embodiments of the systems disclosed herein.

In some embodiments, the circuit board 1502 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 1502. In other embodiments, the circuit board 1502 may be a non-PCB substrate. In some embodiments the circuit board 1302 may be, for example, the substrate 102. The integrated circuit device assembly 1500 illustrated in FIG. 15 includes a package-on-interposer structure 1536 coupled to the first face 1540 of the circuit board 1502 by coupling components 1516. The coupling components 1516 may electrically and mechanically couple the package-on-interposer structure 1536 to the circuit board 1502, and may include solder balls (as shown in FIG. 15), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 1536 may include an integrated circuit component 1520 coupled to an interposer 1504 by coupling components 1518. The coupling components 1518 may take any suitable form for the application, such as the forms discussed above with reference to the coupling components 1516. Although a single integrated circuit component 1520 is shown in FIG. 15, multiple integrated circuit components may be coupled to the interposer 1504; indeed, additional interposers may be coupled to the interposer 1504. The interposer 1504 may provide an intervening substrate used to bridge the circuit board 1502 and the integrated circuit component 1520.

The integrated circuit component 1520 may be a packaged or unpacked integrated circuit product that includes one or more integrated circuit dies (e.g., the die 1202 of FIG. 12, the integrated circuit device 1300 of FIG. 13) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 1520, a single monolithic integrated circuit die comprises solder bumps attached to contacts on the die. The solder bumps allow the die to be directly attached to the interposer 1504. The integrated circuit component 1520 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 1520 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 1520 comprises multiple integrated circuit dies, they dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 1520 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 1504 may spread connections to a wider pitch or reroute a connection to a different connection. For example, the interposer 1504 may couple the integrated circuit component 1520 to a set of ball grid array (BGA) conductive contacts of the coupling components 1516 for coupling to the circuit board 1502. In the embodiment illustrated in FIG. 15, the integrated circuit component 1520 and the circuit board 1502 are attached to opposing sides of the interposer 1504; in other embodiments, the integrated circuit component 1520 and the circuit board 1502 may be attached to a same side of the interposer 1504. In some embodiments, three or more components may be interconnected by way of the interposer 1504.

In some embodiments, the interposer 1504 may be formed as a PCB, including multiple metal layers separated from one another by layers of dielectric material and interconnected by electrically conductive vias. In some embodiments, the interposer 1504 may be formed of an epoxy resin, a fiberglass-reinforced epoxy resin, an epoxy resin with inorganic fillers, a ceramic material, or a polymer material such as polyimide. In some embodiments, the interposer 1504 may be formed of alternate rigid or flexible materials that may include the same materials described above for use in a semiconductor substrate, such as silicon, germanium, and other group III-V and group IV materials. The interposer 1504 may include metal interconnects 1508 and vias 1510, including but not limited to through hole vias 1510-1 (that extend from a first face 1550 of the interposer 1504 to a second face 1554 of the interposer 1504), blind vias 1510-2 (that extend from the first or second faces 1550 or 1554 of the interposer 1504 to an internal metal layer), and buried vias 1510-3 (that connect internal metal layers).

In some embodiments, the interposer 1504 can comprise a silicon interposer. Through silicon vias (TSV) extending through the silicon interposer can connect connections on a first face of a silicon interposer to an opposing second face of the silicon interposer. In some embodiments, an interposer 1504 comprising a silicon interposer can further comprise one or more routing layers to route connections on a first face of the interposer 1504 to an opposing second face of the interposer 1504.

The interposer 1504 may further include embedded devices 1514, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1504. The package-on-interposer structure 1536 may take the form of any of the package-on-interposer structures known in the art. In embodiments where the interposer is a non-printed circuit board The integrated circuit device assembly 1500 may include an integrated circuit component 1524 coupled to the first face 1540 of the circuit board 1502 by coupling components 1522. The coupling components 1522 may take the form of any of the embodiments discussed above with reference to the coupling components 1516, and the integrated circuit component 1524 may take the form of any of the embodiments discussed above with reference to the integrated circuit component 1520.

The integrated circuit device assembly 1500 illustrated in FIG. 15 includes a package-on-package structure 1534 coupled to the second face 1542 of the circuit board 1502 by coupling components 1528. The package-on-package structure 1534 may include an integrated circuit component 1526 and an integrated circuit component 1532 coupled together by coupling components 1530 such that the integrated circuit component 1526 is disposed between the circuit board 1502 and the integrated circuit component 1532. The coupling components 1528 and 1530 may take the form of any of the embodiments of the coupling components 1516 discussed above, and the integrated circuit components 1526 and 1532 may take the form of any of the embodiments of the integrated circuit component 1520 discussed above. The package-on-package structure 1534 may be configured in accordance with any of the package-on-package structures known in the art.

Figure 16:
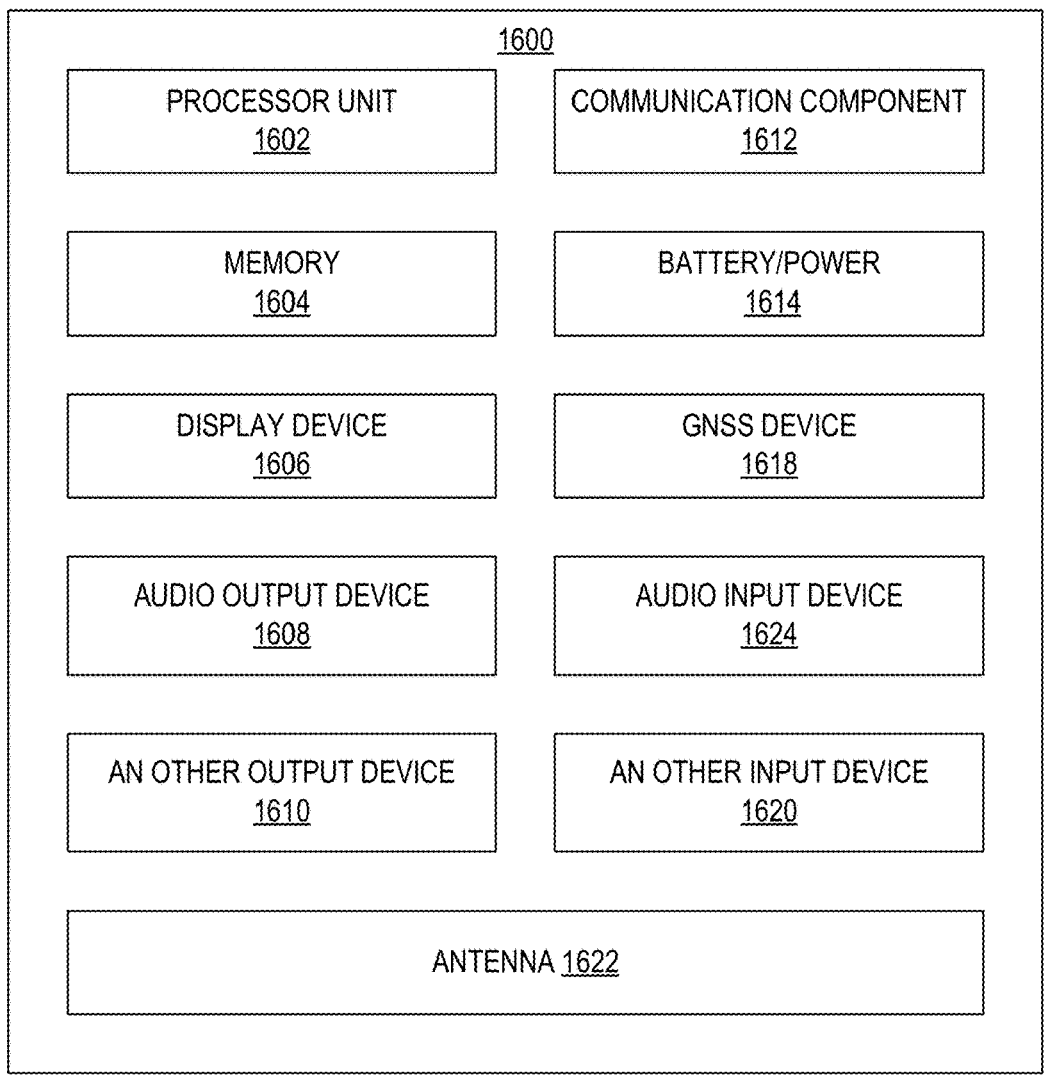
FIG. 16 is a block diagram of an example electrical device that may include a microelectronic assembly, in accordance with any of the embodiments disclosed herein.

FIG. 16 is a block diagram of an example electrical device 1600 that may include one or more of the systems 100, 300, etc. disclosed herein. For example, any suitable ones of the components of the electrical device 1600 may include one or more of the integrated circuit device assemblies 1500, integrated circuit components 1520, integrated circuit devices 1300, or integrated circuit dies 1202 disclosed herein, and may be arranged in any of the systems 100, 300, etc. disclosed herein. A number of components are illustrated in FIG. 16 as included in the electrical device 1600, but any one or more of these components may be omitted or duplicated, as suitable for the application. In some embodiments, some or all of the components included in the electrical device 1600 may be attached to one or more motherboards mainboards, or system boards. In some embodiments, one or more of these components are fabricated onto a single system-on-a-chip (SoC) die.

Additionally, in various embodiments, the electrical device 1600 may not include one or more of the components illustrated in FIG. 16, but the electrical device 1600 may include interface circuitry for coupling to the one or more components. For example, the electrical device 1600 may not include a display device 1606, but may include display device interface circuitry (e.g., a connector and driver circuitry) to which a display device 1606 may be coupled. In another set of examples, the electrical device 1600 may not include an audio input device 1624 or an audio output device 1608, but may include audio input or output device interface circuitry (e.g., connectors and supporting circuitry) to which an audio input device 1624 or audio output device 1608 may be coupled.

The electrical device 1600 may include one or more processor units 1602 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 1602 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 1600 may include a memory 1604, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 1604 may include memory that is located on the same integrated circuit die as the processor unit 1602. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 1600 can comprise one or more processor units 1602 that are heterogeneous or asymmetric to another processor unit 1602 in the electrical device 1600. There can be a variety of differences between the processing units 1602 in a system in terms of a spectrum of metrics of merit including architectural, micro-architectural, thermal, power consumption characteristics, and the like. These differences can effectively manifest themselves as asymmetry and heterogeneity among the processor units 1602 in the electrical device 1600.

In some embodiments, the electrical device 1600 may include a communication component 1612 (e.g., one or more communication components). For example, the communication component 1612 can manage wireless communications for the transfer of data to and from the electrical device 1600. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 1612 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 1612 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 1612 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 1612 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 1612 may operate in accordance with other wireless protocols in other embodiments. The electrical device 1600 may include an antenna 1622 to facilitate wireless communications and/or to receive other wireless communications (such as AM or FM radio transmissions).

In some embodiments, the communication component 1612 may manage wired communications, such as electrical, optical, or any other suitable communication protocols (e.g., IEEE 802.3 Ethernet standards). As noted above, the communication component 1612 may include multiple communication components. For instance, a first communication component 1612 may be dedicated to shorter-range wireless communications such as Wi-Fi or Bluetooth, and a second communication component 1612 may be dedicated to longer-range wireless communications such as global positioning system (GPS), EDGE, GPRS, CDMA, WiMAX, LTE, EV-DO, or others. In some embodiments, a first communication component 1612 may be dedicated to wireless communications, and a second communication component 1612 may be dedicated to wired communications.

The electrical device 1600 may include battery/power circuitry 1614. The battery/power circuitry 1614 may include one or more energy storage devices (e.g., batteries or capacitors) and/or circuitry for coupling components of the electrical device 1600 to an energy source separate from the electrical device 1600 (e.g., AC line power).

The electrical device 1600 may include a display device 1606 (or corresponding interface circuitry, as discussed above). The display device 1606 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 1600 may include an audio output device 1608 (or corresponding interface circuitry, as discussed above). The audio output device 1608 may include any embedded or wired or wirelessly connected external device that generates an audible indicator, such speakers, headsets, or earbuds.

The electrical device 1600 may include an audio input device 1624 (or corresponding interface circuitry, as discussed above). The audio input device 1624 may include any embedded or wired or wirelessly connected device that generates a signal representative of a sound, such as microphones, microphone arrays, or digital instruments (e.g., instruments having a musical instrument digital interface (MIDI) output). The electrical device 1600 may include a Global Navigation Satellite System (GNSS) device 1618 (or corresponding interface circuitry, as discussed above), such as a Global Positioning System (GPS) device. The GNSS device 1618 may be in communication with a satellite-based system and may determine a geolocation of the electrical device 1600 based on information received from one or more GNSS satellites, as known in the art.

The electrical device 1600 may include an other output device 1610 (or corresponding interface circuitry, as discussed above). Examples of the other output device 1610 may include an audio codec, a video codec, a printer, a wired or wireless transmitter for providing information to other devices, or an additional storage device.

The electrical device 1600 may include an other input device 1620 (or corresponding interface circuitry, as discussed above). Examples of the other input device 1620 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 1600 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 1600 may be any other electronic device that processes data. In some embodiments, the electrical device 1600 may comprise multiple discrete physical components. Given the range of devices that the electrical device 1600 can be manifested as in various embodiments, in some embodiments, the electrical device 1600 can be referred to as a computing device or a computing system.

EXAMPLES

Illustrative examples of the technologies disclosed herein are provided below. An embodiment of the technologies may include any one or more, and any combination of, the examples described below.

Example 1 includes a system comprising a first integrated circuit chip; one or more microLEDs mounted on the first integrated circuit chip; a second integrated circuit chip; and one or more microphotodiodes mounted on the second integrated circuit chip, wherein individual microLEDs of the one or more microLEDs create a beam of light to be received by a corresponding microphotodiode of the one or more microphotodiodes, wherein the first integrated circuit chip is to send data to the second integrated circuit chip by modulation of the one or more microLEDs.

Example 2 includes the subject matter of Example 1, and further including an optical bridge comprising a first reflective surface and a second reflective surface, wherein the beam of light of individual microLEDs of the one or more microLEDs is directed from the corresponding microLED to the first reflective surface, wherein the first reflective surface reflects the beam of light of individual microLEDs of the one or more microLEDs to the second reflective surface, wherein the second reflective surface reflects the beam of light of individual microLEDs of the one or more microLEDs to the corresponding microphotodiode of the one or more microphotodiode.

Example 3 includes the subject matter of any of Examples 1 and 2, and further including a plurality of dielectric nanostructures on the first reflective surface and the second reflective surface, wherein the plurality of dielectric nanostructures form a metamirror on the first reflective surface and a metamirror on the second reflective surface.

Example 4 includes the subject matter of any of Examples 1-3, and further including a first set of microprisms and a second set of microprisms, wherein each of the one or more microLEDs has one of the first set of microprisms mounted on it, wherein each of the one or more microphotodiodes has one of the second set of microprisms mounted on it, wherein the beam of light of individual microLEDs of the one or more microLEDs reflects from a surface of the microprism mounted on it towards the microprism mounted on the corresponding photodiode.

Example 5 includes the subject matter of any of Examples 1-4, and wherein the one or more microLEDs mounted on the first integrated circuit chip are mounted on a surface of the first integrated circuit chip, wherein the beam of light of individual microLEDs of the one or more microLEDs is directed perpendicular to the surface of the first integrated circuit chip, wherein the beam of light of individual microLEDs of the one or more microLEDs is directed directly towards the corresponding microphotodiode of the second integrated circuit chip.

Example 6 includes the subject matter of any of Examples 1-5, and further including a substrate, wherein the first integrated circuit chip is mounted on a top surface of the substrate, wherein the second integrated circuit chip is mounted on the top surface the substrate, wherein a channel is defined in the substrate extending from the first integrated circuit chip to the second integrated circuit chip, wherein the beam of light of individual microLEDs of the one or more microLEDs is to travel through the channel from the first integrated circuit chip to the second integrated circuit chip.

Example 7 includes the subject matter of any of Examples 1-6, and wherein the channel comprises a first reflective surface and a second reflective surface, wherein the beam of light of individual microLEDs of the one or more microLEDs is directed from the corresponding microLED to the first reflective surface, wherein the first reflective surface reflects the beam of light of individual microLEDs of the one or more microLEDs to the second reflective surface, wherein the second reflective surface reflects the beam of light of individual microLEDs of the one or more microLEDs to the corresponding microphotodiode of the one or more microphotodiode.

Example 8 includes the subject matter of any of Examples 1-7, and further including a plurality of dielectric nanostructures on the first reflective surface and the second reflective surface, wherein the plurality of dielectric nanostructures form a metamirror on the first reflective surface and a metamirror on the second reflective surface.

Example 9 includes the subject matter of any of Examples 1-8, and further including a substrate, wherein the first integrated circuit chip is mounted on a first surface of the substrate, wherein the second integrated circuit chip is mounted on a second surface the substrate, the second surface opposite the first surface, wherein a channel is defined in the substrate extending from the first surface to the second surface, wherein the beam of light of individual microLEDs of the one or more microLEDs is to travel through the channel from the first integrated circuit chip to the second integrated circuit chip.

Example 10 includes the subject matter of any of Examples 1-9, and wherein a beam of light of a first microLED of the one or more microLEDs is incident on a first photodiode and a second photodiode of the one or more photodiodes, wherein a beam of light of a second microLED of the one or more microLEDs is incident on the first photodiode and the second photodiode, wherein the first photodiode is sensitive to the beam of light of the first microLED and not sensitive to the beam of light of the second microLED, wherein the second photodiode is sensitive to the beam of light of the second microLED and not sensitive to the beam of light of the first microLED, wherein the first microLED and the first microphotodiode form a first channel, wherein the second microLED and the second microphotodiode form a second channel independent of the first channel.

Example 11 includes the subject matter of any of Examples 1-10, and wherein the first integrated circuit chip is to send data to the second integrated circuit chip by modulation of the one or more microLEDs with an energy efficiency of less than 1 picojoule per bit.

Example 12 includes the subject matter of any of Examples 1-11, and wherein the first integrated circuit chip is in the same package as the second integrated circuit chip.

Example 13 includes the subject matter of any of Examples 1-12, and wherein the first integrated circuit chip is in a first package, wherein the second integrated circuit chip is in a second package different from the first package.

Example 14 includes the subject matter of any of Examples 1-13, and wherein the first integrated circuit chip is to send data to the second integrated circuit chip by modulation of the one or more microLEDs at a bit rate of more than one gigabit per second per microLED.

Example 15 includes the subject matter of any of Examples 1-14, and wherein the one or more microLEDs comprise at least 100 microLEDs.

Example 16 includes the subject matter of any of Examples 1-15, and further including a processor comprising a substrate, wherein the first integrated circuit chip is mounted on the substrate, wherein the second integrated circuit chip is mounted on the substrate.

Example 17 includes an apparatus comprising an integrated circuit chip; a plurality of microLEDs mounted on the integrated circuit chip; and a plurality of microphotodiodes mounted on the integrated circuit chip, wherein the integrated circuit chip is to transmit data to a remote integrated circuit chip by modulation of individual microLEDs of the plurality of microLEDs, wherein the integrated circuit chip is to receive data from the remote integrated circuit chip by reception of modulated light by individual microphotodiodes of the plurality of microphotodiodes.

Example 18 includes the subject matter of Example 17, and further including an optical bridge comprising a first reflective surface and a second reflective surface, wherein a beam of light of individual microLEDs of the plurality of microLEDs is directed from the corresponding microLED to the first reflective surface, wherein the first reflective surface reflects the beam of light of individual microLEDs of the plurality of microLEDs to the second reflective surface, wherein the second reflective surface reflects the beam of light of individual microLEDs of the plurality of microLEDs to a microphotodiode of plurality of microphotodiodes of the remote integrated circuit chip.

Example 19 includes the subject matter of any of Examples 17 and 18, and further including a plurality of dielectric nanostructures on the first reflective surface and the second reflective surface, wherein the plurality of dielectric nanostructures form a metamirror on the first reflective surface and a metamirror on the second reflective surface.

Example 20 includes the subject matter of any of Examples 17-19, and further including a first set of microprisms and a second set of microprisms, wherein each of the plurality of microLEDs has one of the first set of microprisms mounted on it, wherein each of the plurality of microphotodiodes has one of the second set of microprisms mounted on it, wherein a beam of light of individual microLEDs of the plurality of microLEDs reflects from a surface of the microprism mounted on it towards the microprism mounted on the corresponding photodiode.

Example 21 includes the subject matter of any of Examples 17-20, and wherein a beam of light of a first microLED of the plurality of microLEDs is incident on a first photodiode and a second photodiode of a plurality of photodiodes of the remote integrated circuit chip, wherein a beam of light of a second microLED of the plurality of microLEDs is incident on the first photodiode and the second photodiode, wherein the first photodiode is sensitive to the beam of light of the first microLED and not sensitive to the beam of light of the second microLED, wherein the second photodiode is sensitive to the beam of light of the second microLED and not sensitive to the beam of light of the first microLED, wherein the first microLED and the first microphotodiode form a first channel, wherein the second microLED and the second microphotodiode form a second channel independent of the first channel.

Example 22 includes the subject matter of any of Examples 17-21, and wherein the integrated circuit chip is to transmit data to a remote integrated circuit chip by modulation of individual microLEDs of the plurality of microLEDs with an energy efficiency of less than 1 picojoule per bit.

Example 23 includes the subject matter of any of Examples 17-22, and wherein the integrated circuit chip is in the same package as the remote integrated circuit chip.

Example 24 includes the subject matter of any of Examples 17-23, and wherein the integrated circuit chip is in a first package, wherein the remote integrated circuit chip is in a second package different from the first package.

Example 25 includes the subject matter of any of Examples 17-24, and wherein the integrated circuit chip is to send data to the remote integrated circuit chip by modulation of the plurality of microLEDs at a bit rate of more than one gigabit per second per microLED.

Example 26 includes the subject matter of any of Examples 17-25, and wherein the plurality of microLEDs comprise at least 100 microLEDs.

Example 27 includes the subject matter of any of Examples 17-26, and further including a processor comprising a substrate, wherein the integrated circuit chip is mounted on the substrate, wherein the remote integrated circuit chip is mounted on the substrate.

Example 28 includes the subject matter of any of Examples 17-27, and wherein the plurality of microLEDs and the plurality of microphotodiodes form a plurality of transmitter/receiver pairs, wherein individual transmitter/receiver pairs comprise a microLED of the plurality of microLEDs and a microphotodiode of the plurality of microphotodiodes, wherein the microLED and the microphotodiode of individual transmitter/receiver pairs are next to each other.

Example 29 includes a system comprising a first integrated circuit chip; one or more microLEDs mounted on the first integrated circuit chip; a second integrated circuit chip; one or more microphotodiodes mounted on the second integrated circuit chip; and means for transmitting data from the first integrated circuit chip to the second integrated circuit chip with use of the one or more microLEDs and the one or more microphotodiodes.

Example 30 includes the subject matter of Example 29, and wherein the means for transmitting data from the first integrated circuit chip to the second integrated circuit chip comprises one or more reflective surfaces comprising a metamaterial.

Example 31 includes the subject matter of any of Examples 29 and 30, and wherein the means for transmitting data from the first integrated circuit chip to the second integrated circuit chip comprises means for transmitting data from the first integrated circuit chip to the second integrated circuit chip at an energy efficiency of less than 1 picojoule per bit.

The invention claimed is:

1. A system comprising:
   a first integrated circuit chip;
   one or more microLEDs mounted on the first integrated circuit chip;
   a second integrated circuit chip;
   one or more microphotodiodes mounted on the second integrated circuit chip; and
   a substrate,
   wherein individual microLEDs of the one or more microLEDs are to create a beam of light to be received by a corresponding microphotodiode of the one or more microphotodiodes,
   wherein the first integrated circuit chip is to send data to the second integrated circuit chip by modulation of the one or more microLEDs,
   wherein the first integrated circuit chip is mounted on a top surface of the substrate,
   wherein the second integrated circuit chip is mounted on the top surface the substrate,
   wherein a channel is defined in the substrate extending from the first integrated circuit chip to the second integrated circuit chip,
   wherein the beam of light of individual microLEDs of the one or more microLEDs is to travel through the channel from the first integrated circuit chip to the second integrated circuit chip.

2. The system of claim 1, further comprising:
   an optical bridge comprising a first reflective surface and a second reflective surface,
   wherein the beam of light of individual microLEDs of the one or more microLEDs is directed from the corresponding microLED to the first reflective surface,
   wherein the first reflective surface reflects the beam of light of individual microLEDs of the one or more microLEDs to the second reflective surface,
   wherein the second reflective surface reflects the beam of light of individual microLEDs of the one or more microLEDs to the corresponding microphotodiode of the one or more microphotodiode.

3. The system of claim 2, further comprising a plurality of dielectric nanostructures on the first reflective surface and the second reflective surface, wherein the plurality of dielectric nanostructures form a metamirror on the first reflective surface and a metamirror on the second reflective surface.

4. The system of claim 1, further comprising a first set of microprisms and a second set of microprisms, wherein each of the one or more microLEDs has one of the first set of microprisms mounted on it, wherein each of the one or more microphotodiodes has one of the second set of microprisms mounted on it, wherein the beam of light of individual microLEDs of the one or more microLEDs reflects from a surface of the microprism mounted on it towards the microprism mounted on the corresponding microphotodiode.

5. The system of claim 1, wherein the channel comprises a first reflective surface and a second reflective surface,
   wherein the beam of light of individual microLEDs of the one or more microLEDs is directed from the corresponding microLED to the first reflective surface,
   wherein the first reflective surface reflects the beam of light of individual microLEDs of the one or more microLEDs to the second reflective surface,
   wherein the second reflective surface reflects the beam of light of individual microLEDs of the one or more microLEDs to the corresponding microphotodiode of the one or more microphotodiode.

6. The system of claim 5, further comprising a plurality of dielectric nanostructures on the first reflective surface and the second reflective surface, wherein the plurality of dielectric nanostructures form a metamirror on the first reflective surface and a metamirror on the second reflective surface.

7. The system of claim 1, wherein a beam of light of a first microLED of the one or more microLEDs is incident on a first microphotodiode and a second microphotodiode of the one or more microphotodiodes,
   wherein a beam of light of a second microLED of the one or more microLEDs is incident on the first microphotodiode and the second microphotodiode,
   wherein the first microphotodiode is sensitive to the beam of light of the first microLED and not sensitive to the beam of light of the second microLED,
   wherein the second microphotodiode is sensitive to the beam of light of the second microLED and not sensitive to the beam of light of the first microLED,
   wherein the first microLED and the first microphotodiode form a first channel,
   wherein the second microLED and the second microphotodiode form a second channel independent of the first channel.

8. The system of claim 1, wherein the first integrated circuit chip is to send data to the second integrated circuit chip by modulation of the one or more microLEDs with an energy efficiency of less than 1 picojoule per bit.

9. The system of claim 1, wherein the first integrated circuit chip is in the same package as the second integrated circuit chip.

10. The system of claim 1, wherein the first integrated circuit chip is in a first package, wherein the second integrated circuit chip is in a second package different from the first package.

11. The system of claim 1, further comprising a processor, the processor comprising the substrate.

12. The system of claim 1, wherein the first integrated circuit chip is to send data to the second integrated circuit chip by modulation of the one or more microLEDs at a bit rate of more than one gigabit per second per microLED.

13. The system of claim 12, wherein the one or more microLEDs comprise at least 100 microLEDs.

14. A system comprising:
an integrated circuit (IC) chip;
a plurality of microLEDs mounted on the IC chip; and
a plurality of microphotodiodes mounted on the IC chip,
wherein the IC chip is to transmit data by modulation of individual microLEDs of the plurality of microLEDs,
wherein the IC chip is to receive data by reception of modulated light by individual microphotodiodes of the plurality of microphotodiodes,
wherein a first microLED of the plurality of microLEDs is to create a beam of light incident on a first microphotodiode and a second microphotodiode of the plurality of microphotodiodes,
wherein a second microLED of the plurality of microLEDs is to create a beam of light incident on the first microphotodiode and the second microphotodiode,
wherein the first microphotodiode is sensitive to the beam of light of the first microLED and not sensitive to the beam of light of the second microLED,
wherein the second microphotodiode is sensitive to the beam of light of the second microLED and not sensitive to the beam of light of the first microLED,
wherein the first microLED and the first microphotodiode form a first channel,
wherein the second microLED and the second microphotodiode form a second channel independent of the first channel.

15. The system of claim 14, wherein the IC chip is a first IC chip, further comprising:
a second IC chip
an optical bridge comprising a first reflective surface and a second reflective surface,
wherein individual microLEDs of the plurality of microLEDS are to direct a beam of light from the corresponding microLED to the first reflective surface,
wherein the first reflective surface is to reflect the beam of light of individual microLEDs of the plurality of microLEDs to the second reflective surface,
wherein the second reflective surface is to reflect the beam of light of individual microLEDs of the plurality of microLEDs to a microphotodiode of plurality of microphotodiodes of the second IC chip.

16. The system of claim 15, further comprising a plurality of dielectric nanostructures on the first reflective surface and the second reflective surface, wherein the plurality of dielectric nanostructures form a metamirror on the first reflective surface and a metamirror on the second reflective surface.

17. The system of claim 14, wherein the IC chip is to transmit data by modulation of individual microLEDs of the plurality of microLEDs with an energy efficiency of less than 1 picojoule per bit.

18. The system of claim 14, wherein the IC chip is to send data by modulation of the plurality of microLEDs at a bit rate of more than one gigabit per second per microLED.

19. The system of claim 18, wherein the plurality of microLEDs comprise at least 100 microLEDs.

20. The system of claim 14, wherein the IC chip is to transmit data by modulation of individual microLEDs of the plurality of microLEDs to a second IC chip, further comprising a processor comprising:
a substrate, wherein the IC chip is mounted on the substrate, wherein the second IC chip is mounted on the substrate.

21. The system of claim 14, wherein the plurality of microLEDs and the plurality of microphotodiodes form a plurality of transmitter/receiver pairs, wherein individual transmitter/receiver pairs comprise a microLED of the plurality of microLEDs and a microphotodiode of the plurality of microphotodiodes, wherein the microLED and the microphotodiode of individual transmitter/receiver pairs are next to each other.

22. The system of claim 14, wherein the IC chip is to transmit data by modulation of individual microLEDs of the plurality of microLEDs to a second IC chip, wherein the IC chip is in the same package as the second IC chip.

23. The system of claim 14, wherein the IC chip is to transmit data by modulation of individual microLEDs of the plurality of microLEDs to a second IC chip, wherein the IC chip is in a first package, wherein the second IC chip is in a second package different from the first package.

24. A system comprising:
a first integrated circuit chip;
one or more microLEDs mounted on the first integrated circuit chip;
a second integrated circuit chip;
one or more microphotodiodes mounted on the second integrated circuit chip; and
means for transmitting data from the first integrated circuit chip to the second integrated circuit chip with use of the one or more microLEDs and the one or more microphotodiodes,
wherein the one or more microLEDs mounted on the first integrated circuit chip are mounted on a surface of the first integrated circuit chip,
wherein the means for transmitting data from the first integrated circuit chip to the second integrated circuit chip comprises directing a beam of light from individual microLEDs of the one or more microLEDs perpendicular to the surface of the first integrated circuit chip,
wherein the beam of light from individual microLEDs of the one or more microLEDs is directed directly towards the corresponding microphotodiode of the second integrated circuit chip.

25. The system of claim 24, wherein the means for transmitting data from the first integrated circuit chip to the second integrated circuit chip comprises means for transmitting data from the first integrated circuit chip to the second integrated circuit chip at an energy efficiency of less than 1 picojoule per bit.

* * * * *